US011708208B2

(12) United States Patent
Brace et al.

(10) Patent No.: US 11,708,208 B2
(45) Date of Patent: Jul. 25, 2023

(54) $CO_2$ GENERATOR SYSTEM FOR CARBONATED BEVERAGE CONTAINERS

(71) Applicant: AMCOR RIGID PACKAGING USA, LLC, Ann Arbor, MI (US)

(72) Inventors: John Brace, Saline, MI (US); Farhan Ahmad, Canton, MI (US); Seungman Sohn, Glenview, IL (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 133 days.

(21) Appl. No.: 16/466,394

(22) PCT Filed: Dec. 6, 2017

(86) PCT No.: PCT/US2017/064877
§ 371 (c)(1),
(2) Date: Jun. 4, 2019

(87) PCT Pub. No.: WO2018/106786
PCT Pub. Date: Jun. 14, 2018

(65) Prior Publication Data
US 2019/0344950 A1      Nov. 14, 2019

Related U.S. Application Data

(60) Provisional application No. 62/430,659, filed on Dec. 6, 2016.

(51) Int. Cl.
*B65D 81/20* (2006.01)
*C01B 32/50* (2017.01)
*B65D 51/28* (2006.01)

(52) U.S. Cl.
CPC ......... *B65D 81/2076* (2013.01); *B65D 51/28* (2013.01); *C01B 32/50* (2017.08)

(58) Field of Classification Search
CPC .. B65D 81/2076; B65D 51/244; B65D 51/28; B65D 51/2878; B65D 51/30
See application file for complete search history.

(56) References Cited

U.S. PATENT DOCUMENTS

| 2,591,990 A | 4/1952 | Wisdom |
| 3,888,998 A | 6/1975 | Sampson et al. |

(Continued)

FOREIGN PATENT DOCUMENTS

| AU | 2011213722 A1 | 9/2011 |
| CN | 102552462 A | 7/2012 |

(Continued)

OTHER PUBLICATIONS

Supplementary European Search Report issued in corresponding European Patent Application No. 17878099 dated Jun. 19, 2020 (12 pages).

(Continued)

*Primary Examiner* — Jeffrey R Allen
(74) *Attorney, Agent, or Firm* — Harness, Dickey & Pierce, P.L.C.

(57) ABSTRACT

A closure for a container. The closure includes a carbon dioxide emitter, and a release rate control layer that is configured to control release of carbon dioxide from the carbon dioxide emitter into the container when the closure is coupled to the container.

30 Claims, 38 Drawing Sheets

(56) References Cited

U.S. PATENT DOCUMENTS

| | | | |
|---|---|---|---|
| 4,214,011 | A | 7/1980 | Strube |
| 4,316,409 | A | 2/1982 | Adams et al. |
| 4,316,497 | A | 2/1982 | Wakefield et al. |
| 4,679,602 | A | 7/1987 | Hollis et al. |
| 4,899,897 | A * | 2/1990 | Buttiker .............. B65D 51/30 215/256 |
| 5,021,219 | A | 6/1991 | Rudick et al. |
| 5,855,942 | A | 1/1999 | Rule |
| 5,958,479 | A * | 9/1999 | Roitberg .............. A23B 9/20 426/546 |
| 7,387,205 | B1 | 6/2008 | Wilson |
| 8,877,872 | B2 * | 11/2014 | Anderson .............. D01F 11/14 525/374 |
| 2003/0097953 | A1 * | 5/2003 | Serizawa .............. C06D 5/06 149/19.7 |
| 2005/0230415 | A1 * | 10/2005 | Forgac .............. B01F 3/04794 222/1 |
| 2007/0059362 | A1 | 3/2007 | Rau |
| 2010/0000901 | A1 * | 1/2010 | Jupin .............. B65D 35/08 206/524.4 |
| 2016/0009909 | A1 | 1/2016 | Lopez et al. |
| 2019/0282996 | A1 * | 9/2019 | Thatte .............. B01J 20/0248 |

FOREIGN PATENT DOCUMENTS

| | | |
|---|---|---|
| CN | 104479130 A | 4/2015 |
| CO | 15159295 | 12/2015 |
| GB | 1459479 A | 12/1976 |
| JP | 2011051656 A | 3/2011 |
| JP | 2013180752 A | 9/2013 |
| KR | 20070114423 A | 12/2007 |
| MX | PA00003551 | 4/2000 |
| WO | WO-00071461 A1 | 11/2000 |
| WO | 2005084464 A2 | 9/2005 |

OTHER PUBLICATIONS

International Search Report and Written Opinion issued in PCT/US2017/064877, dated Mar. 15, 2018; ISA/KR.

Supplementary Partial European Search Report issued in corresponding European Patent Application No. 17878099 dated May 19, 2020 (14 pages).

Office Action issued in corresponding Colombian Patent Application No. NC2019/0005929 dated Sep. 26, 2022.

* cited by examiner

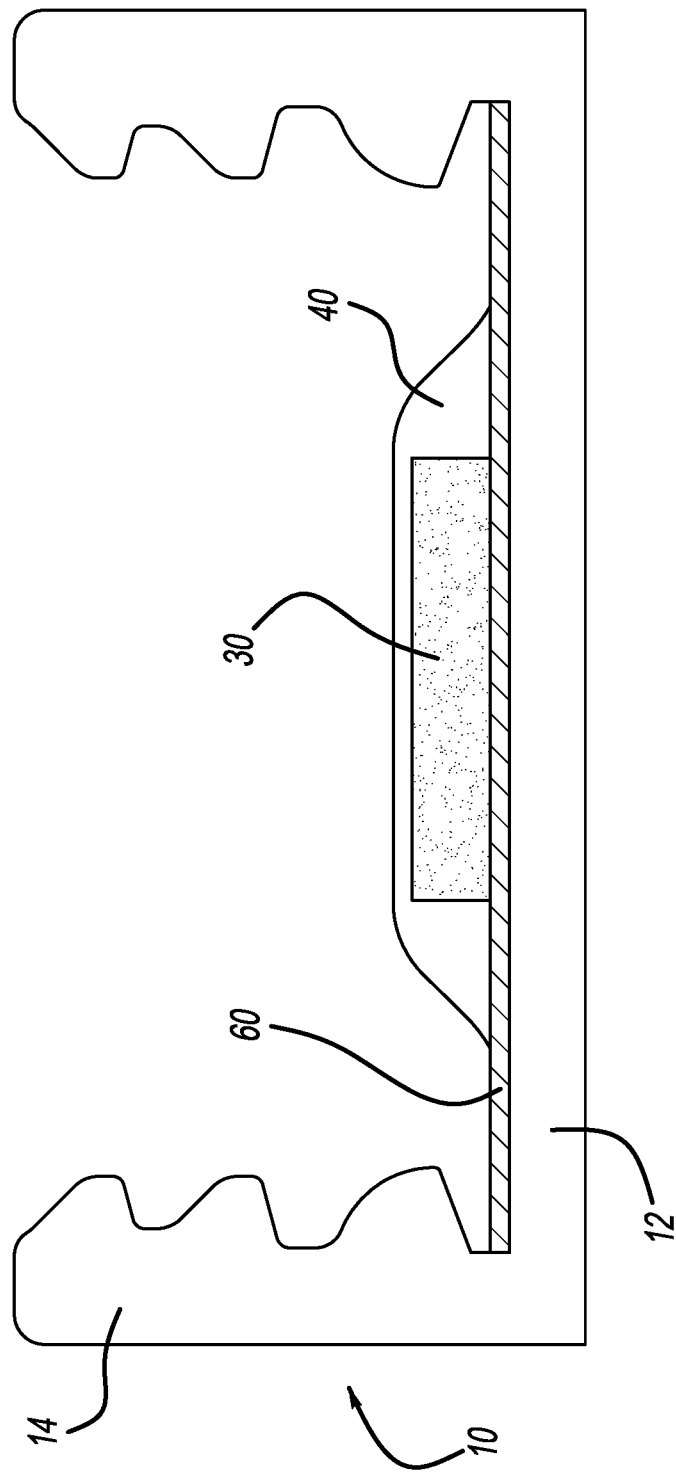

| Bicarbonate | g/mole | Wt % CO$_2$ | cc[STP]/g | Stable solid at RT | Food safety |
|---|---|---|---|---|---|
| NaHCO$_3$ | 84.0 | 52.4 | 267 | yes | GRAS, many uses |
| KHCO$_3$ | 100.1 | 44.0 | 224 | no | GRAS |
| CsHCO$_3$ | 193.1 | 22.7 | 116 | yes | no |
| Mg(HCO$_3$)$_2$ | 146.3 | 60.2 | 307 | no | GRAS? |
| Ca(HCO$_3$)$_2$ | 162.1 | 54.3 | 277 | no | ? |
| (NH$_4$)HCO$_3$ | 73.9 | 55.6 | 283 | yes | baking usage |
| LiHCO$_3$ | 73.9 | 59.5 | 303 | no | ? |
| CO$_2$ (reference) | 44.0 | 100.0 | 509 | no | GRAS |

FIG - 4A

Table: Various acids or acid blends that can be used with appropriate base for generating CO2

| Acid | #reactable acid groups | MW g/mole | Food contact - FDA/EU | density g/cc | pKa value(s) |
|---|---|---|---|---|---|
| phosphoric*** | 1* | 97.99 | permitted/ E338 | 1.885 | 2.15; 7.20; 12.32 |
| citric | 3 | 192.1 | Gras/ E330 | 1.665 | 3.13; 4.76; 6.39 |
| tartaric** | 2 | 150.1 | Gras/ E334 | 1.79 | 3.22; 4.85 |
| L-malic | 2 | 134.1 | Gras/ E296 | 1.609 | 3.40; 5.20 |
| adipic | 2 | 146.1 | Gras/ E355 | 1.360 | 4.43; 5.41 |
| fumaric | 2 | 116.1 | permitted/ E297 | 1.635 | 3.03; 4.44 |
| stearic*** | 1 | 284.5 | permitted/ E570 | 0.941 | 4.75 |

*tribasic but pKa2 and pKa3 are very high. implying no reactivity
**several stereoisomers with different properties and reactivities
***not used as CO2 reactant included for reference

| Formulation | BC (g) | CA (g) | MCC (g) | PVP (g) | MS (g) | SA (g) | Total amount (gm) | BC/CA wt. ratio | Calculated BC moles /kg formulation | Calculated CA moles/kg formulation |
|---|---|---|---|---|---|---|---|---|---|---|
| Old F4 | 600.0 | 353.0 | 26.0 | 0.0 | 21.0 | - | 1000 | 1.7 | 7.1 | 1.8 |
| Old F5 | 600.0 | 353.0 | 0.0 | 20.0 | 27.0 | - | 1000 | 1.7 | 7.1 | 1.8 |
| Old F4' | 625.0 | 333.0 | 20.0 | 0.0 | 22.0 | - | 1000 | 1.9 | 7.4 | 1.7 |
| Old F5' | 625.0 | 333.0 | 0.0 | 15.0 | 27.0 | - | 1000 | 1.9 | 7.4 | 1.7 |
| New F4 | 625.0 | 323.0 | 25.0 | - | 27.0 | - | 1000 | 1.9 | 7.4 | 1.7 |
| New F5 | 625.0 | 323.0 | 0.0 | 25.0 | 27.0 | - | 1000 | 1.9 | 7.4 | 1.7 |
| New F4-2%SA | 625.0 | 323.0 | 25.0 | - | 7.0 | 20.0 | 1000 | 1.9 | 7.4 | 1.7 |
| New F5-4%SA | 625.0 | 323.0 | 12.0 | 0.0 | 0.0 | 40.0 | 1000 | 1.9 | 7.4 | 1.7 |
| F9 | 600.0 | 350.0 | 6.0 | 0.0 | 5.5 | 38.5 | 1000 | 1.7 | 7.1 | 1.8 |
| F9- Large Batch | 600.0 | 350.0 | 6.0 | 0.0 | 5.5 | 38.5 | 1000 | 1.7 | 7.1 | 1.8 |
| F10 | 600.0 | 330.0 | 6.0 | 0.0 | 5.5 | 58.5 | 1000 | 1.8 | 7.1 | 1.7 |
| F11 | 600.0 | 325.0 | 0.0 | - | 5.5 | 69.5 | 1000 | 1.8 | 7.1 | 1.7 |
| F12 | 580.0 | 375.0 | - | 0.0 | 5.0 | 40.0 | 1000 | 1.5 | 6.9 | 2.0 |
| Test Form. 1 | 545 | 408.0 | 26.0 | - | 21.00 | - | 1000 | 1.3 | 6.5 | 2.1 |
| Test Form. 2 | 700 | 260.0 | 0.0 | 25.00 | 15.00 | - | 1000 | 2.7 | 8.3 | 1.4 |
| Test Form. 3 | 350 | 603.0 | 26.0 | - | 21.00 | - | 1000 | 0.6 | 4.2 | 3.1 |

FIG-4C.1

| Calculated BC/CA mole ratio | Theor. BC/CA mole ratio | Limiting reagent | CO2 moles produced/kg of formulation | CO2 volume produced (L)/kg formulation | Mean Tablet weight (gm) | # of tablets/kg formulation | Theoretical CO2 volume produced (ccSTP)/tablet | Experimental ccCO2/tablet |
|---|---|---|---|---|---|---|---|---|
| 3.9 | 3.0 | CA | 5.5 | 123.6 | 1.47 | 680.3 | 182 | 180 ±9 |
| 3.9 | 3.0 | CA | 5.5 | 123.6 | 1.46 | 684.9 | 180 | 178 ±6 |
| 4.3 | 3.0 | CA | 5.2 | 116.6 | 1.55 | 645.2 | 181 | 172 ±7 |
| 4.3 | 3.0 | CA | 5.2 | 116.6 | 1.55 | 645.2 | 181 | 176 ±9 |
| 4.4 | 3.0 | CA | 5.0 | 113.1 | 1.78 | 561.8 | 201 | 187 ±7 |
| 4.4 | 3.0 | CA | 5.0 | 113.1 | 1.58 | 632.9 | 179 | 172 ±6 |
| 4.4 | 3.0 | CA | 5.0 | 113.1 | 1.70 | 588.2 | 192 | 181 ±5 |
| 3.9 | 3.0 | CA | 5.5 | 122.5 | 1.61 | 621.1 | 182 | 184 ±1 |
| 3.9 | 3.0 | CA | 5.5 | 122.5 | 1.71 | 584.8 | 209 | 191±1 |
| 4.2 | 3.0 | CA | 5.2 | 115.5 | 1.67 | 598.8 | 205 | 192±3 |
| 4.2 | 3.0 | CA | 5.1 | 113.8 | 1.68 | 595.2 | 194 | 186±2 |
| 3.5 | 3.0 | CA | 5.9 | 131.3 | 1.66 | 602.4 | 189 | 178±2 |
| 3.1 | 3.0 | CA | 6.4 | 142.8 | 1.50 | 666.7 | 197 | 186±6 |
| 6.2 | 3.0 | CA | 4.1 | 91.0 | 1.50 | 666.7 | 214 | 199±1 |
| 6.2 | 3.0 | CA | 4.1 | 91.0 | 1.50 | 666.7 | 137 | 145 ±0 |
| 1.3 | 3.0 | BC | 4.2 | 93.3 | 1.50 | 666.7 | 140 | 145 ±8 |

| Run order | Variable | Formulation/ thickness mm | Overlayer mm | CR polymer/ density | Cap | Strategy/ Test | Target Qty |
|---|---|---|---|---|---|---|---|
| 8 | L1 | F4 4.50 | 0.50 | LDPE 0.92 | 28mm 1881 | Thick low-rate MCC | 30 |
| 9 | L2 | F4 4.75 | 0.25 | LDPE 0.92 | 28mm 1881 | Thin low-rate MCC | 30 |
| 10 | L3 | F4 4.50 | 0.50 | LDPE 0.92 | 28mm 1881 | Thick low-rate PVP | 30 |
| 11 | L4 | F4 4.75 | 0.25 | LDPE 0.92 | 28mm 1881 | Thin low-rate PVP | 30 |
| 12 | L1_R | F4 4.50 | 0.50 | LDPE 0.92 | 33mm SK33/12 | Thick ref. MCC | 12 |
| 13 | L2_R | F4 4.75 | 0.25 | LDPE 0.92 | 33mm SK33/12 | Thin ref. MCC | 12 |
| 1 | Blank | none | — | EVA 9% VA 0.93 | 28mm 1881 | (-) Control | 12 |
| 2 | V1 | F4 4.50 | 0.50 | EVA 9% VA 0.93 | 28mm 1881/1810 | Thick med-rate MCC | 40 |
| 3 | V2 | F4 4.75 | 0.25 | EVA 9% VA 0.93 | 28mm 1881 | Thin med-rate MCC | 30 |
| 4 | V3 | F4 4.50 | 0.50 | EVA 9% VA 0.93 | 28mm 1881/1810 | Thick med-rate PVP | 40 |
| 5 | V4 | F5 4.75 | 0.25 | EVA 9% VA 0.93 | 28mm 1881 | Thin med-rate PVP | 30 |
| 6 | V1_R | F4 4.50 | 0.50 | EVA 9% VA 0.93 | 33mm SK33/12 | Thick med-rate MCC | 12 |
| 7 | V3_R | F5 4.75 | 0.50 | EVA 9% VA 0.93 | 33mm SK33/12 | Thick med-rate PVP | 12 |
| 14 | E1 | F4 4.50 | 0.50 | EVA 18% VA 0.94 | 28mm 1881 | Thick high-rate MCC | 30 |
| 15 | E2 | F4 4.75 | 0.25 | EVA 18% VA 0.94 | 28mm 1881 | Thin high-rate MCC | 30 |
| 16 | E3 | F4 4.50 | 0.50 | EVA 18% VA 0.94 | 28mm 1881 | Thick high-rate PVP | 30 |
| 17 | E4 | F4 4.75 | 0.25 | EVA 18% VA 0.94 | 28mm 1881 | Thin high-rate PVP | 30 |

FIG - 4D

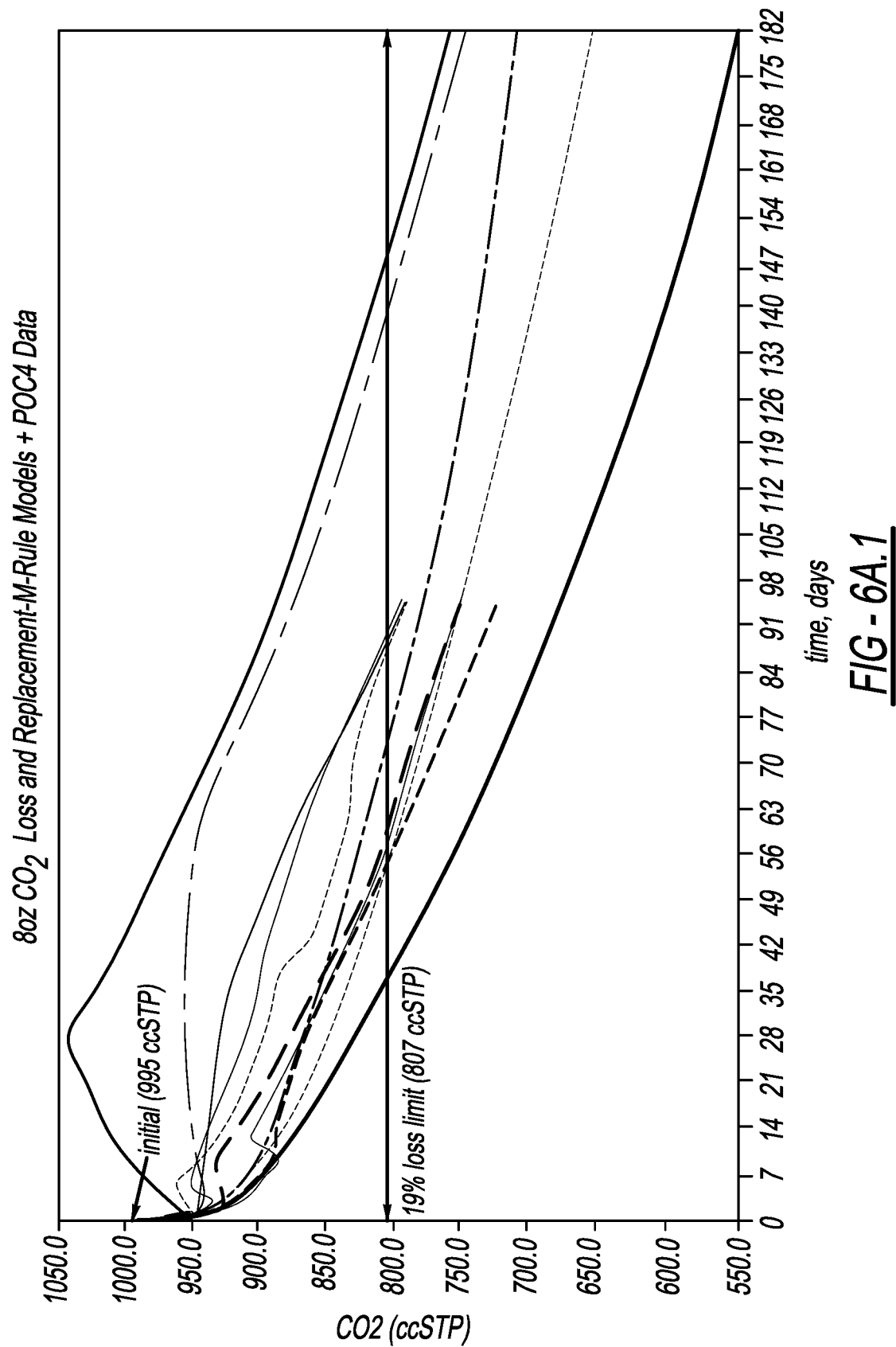
FIG - 6A.1

―――― C7875 13.8g PET_PEcap          -------------- C7875 21.0g PET_PEcap
―――― 13.8g PET+Gen3 cap              ―――――――― 13.8g PET+LS1 sachet
― ― ― 13.8g PET+V9S2 sachet          ―――――――― 13.8g PET+V18S1 sachet ―·――·― 13.8g PET+Gen1 cap            ― ― ―― 13.8g PET+Gen2 cap
― ― ― ― 13.8g PET+LS2 sachet         -------------- 13.8g PET+V9S1 sachet
―――― 13.8g PET+V18S2 sachet

*FIG - 6A.2*

―――― C7875 13.8g PET_PEcap          -------------- C7875 21.0g PET_PEcap
― ― ―― 13.8g PET+Gen2 cap           ―――――――― 13.8g PET+Gen3 cap
―·――·― 13.8g PET+Gen1 cap

*FIG - 6B.2*

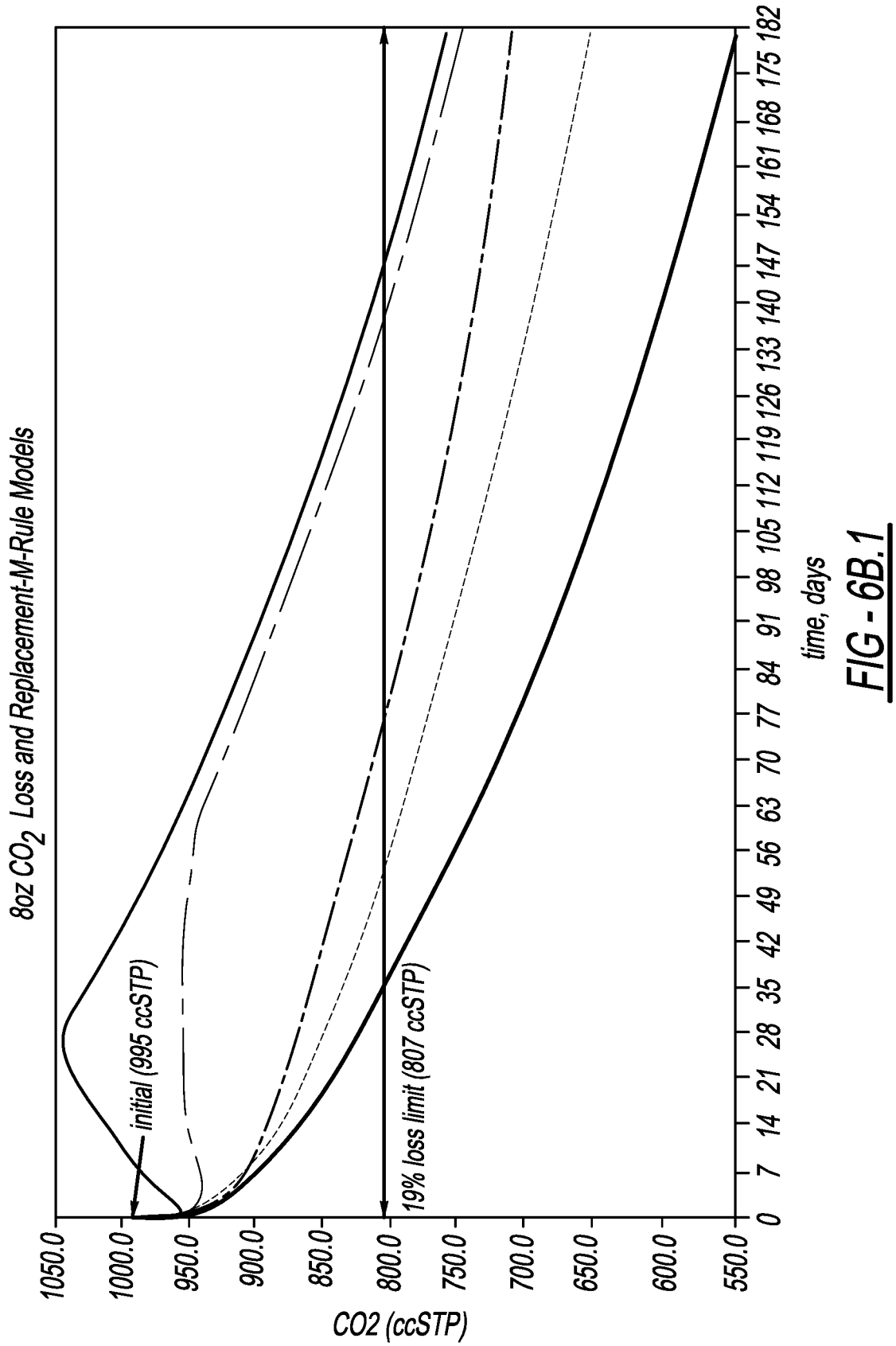
FIG-6B.1

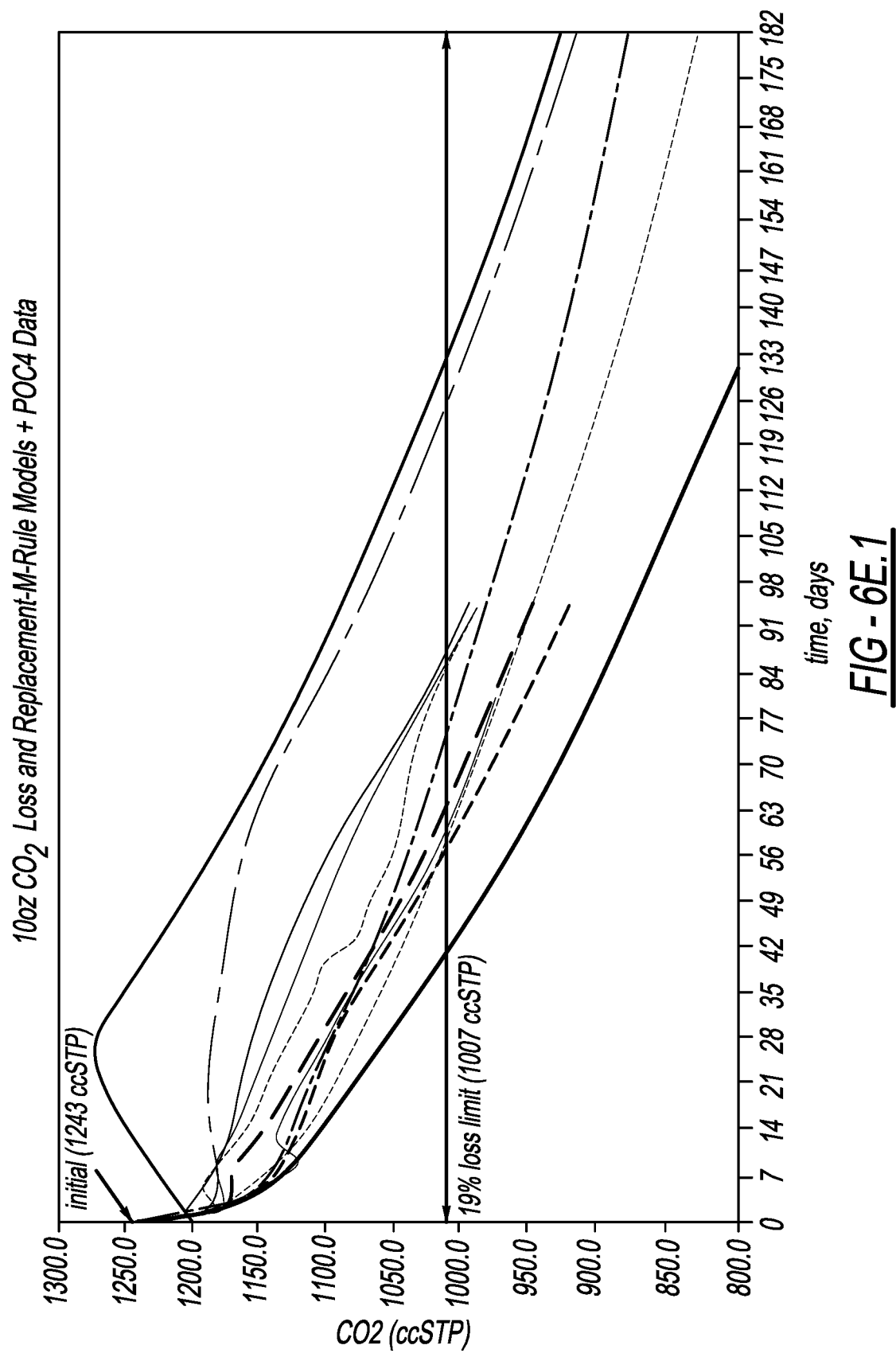
FIG - 6E.1

--- C6686 15.0g PET_PEcap
--- 15.0g PET+Gen3 cap
--- 15.0g PET+V9S2 sachet
--- 15.0g PET+Gen1 cap
--- 15.0g PET+LS2 sachet
--- 15.0g PET+V18S2 sachet
--- C6686 21.9g PET_PEcap
--- 15.0g PET+LS1 sachet
--- 15.0g PET+V18S1 sachet
--- 15.0g PET+Gen2 cap
--- 15.0g PET+V9S1 sachet

*FIG - 6E.2*

--- C6686 15.0g PET_PEcap
--- 15.0g PET+Gen2 cap
--- 15.0g PET+Gen1 cap
--- C6686 21.9g PET_PEcap
--- 15.0g PET+Gen3 cap

*FIG - 6F.2*

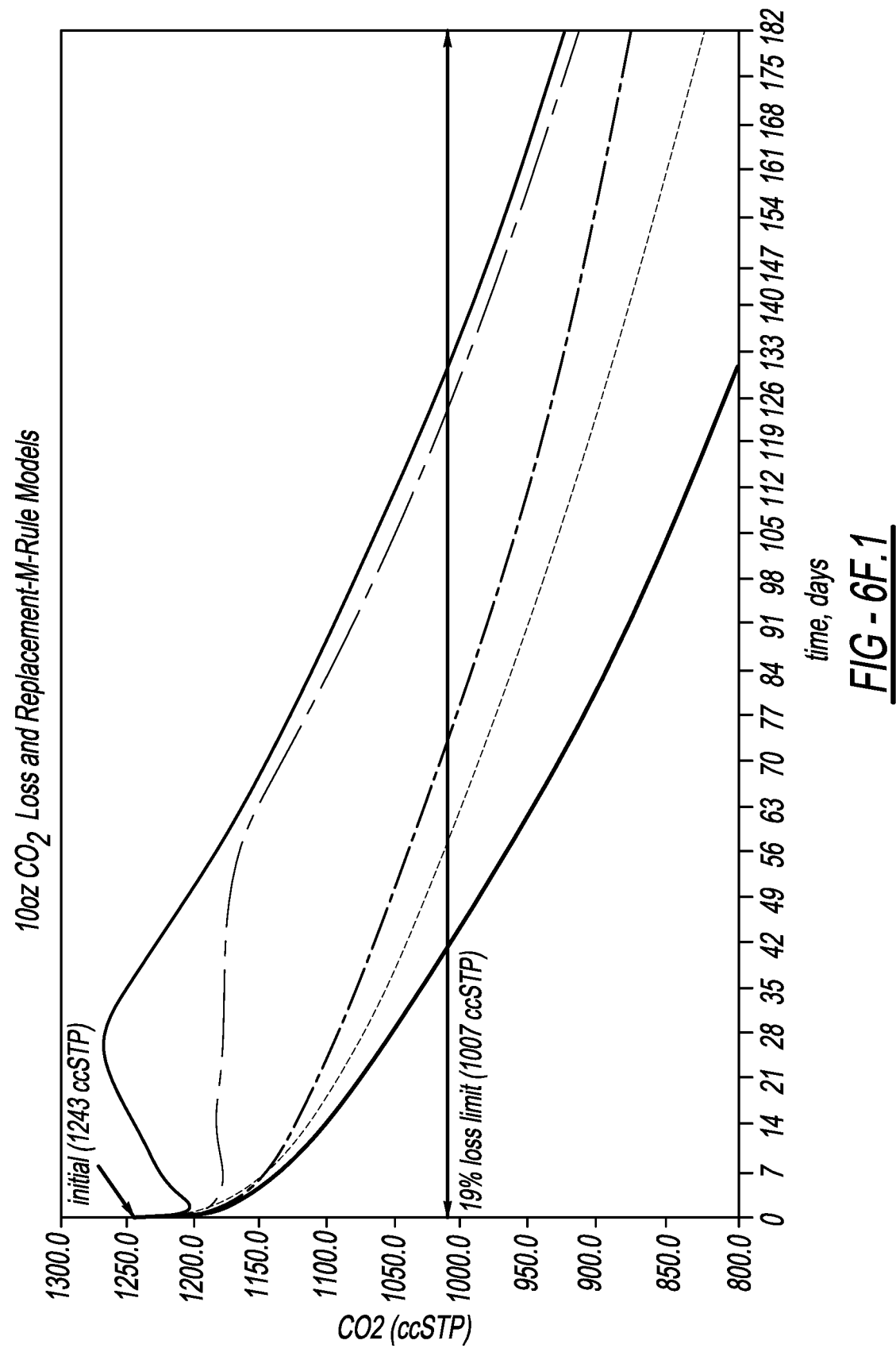
FIG-6F.1

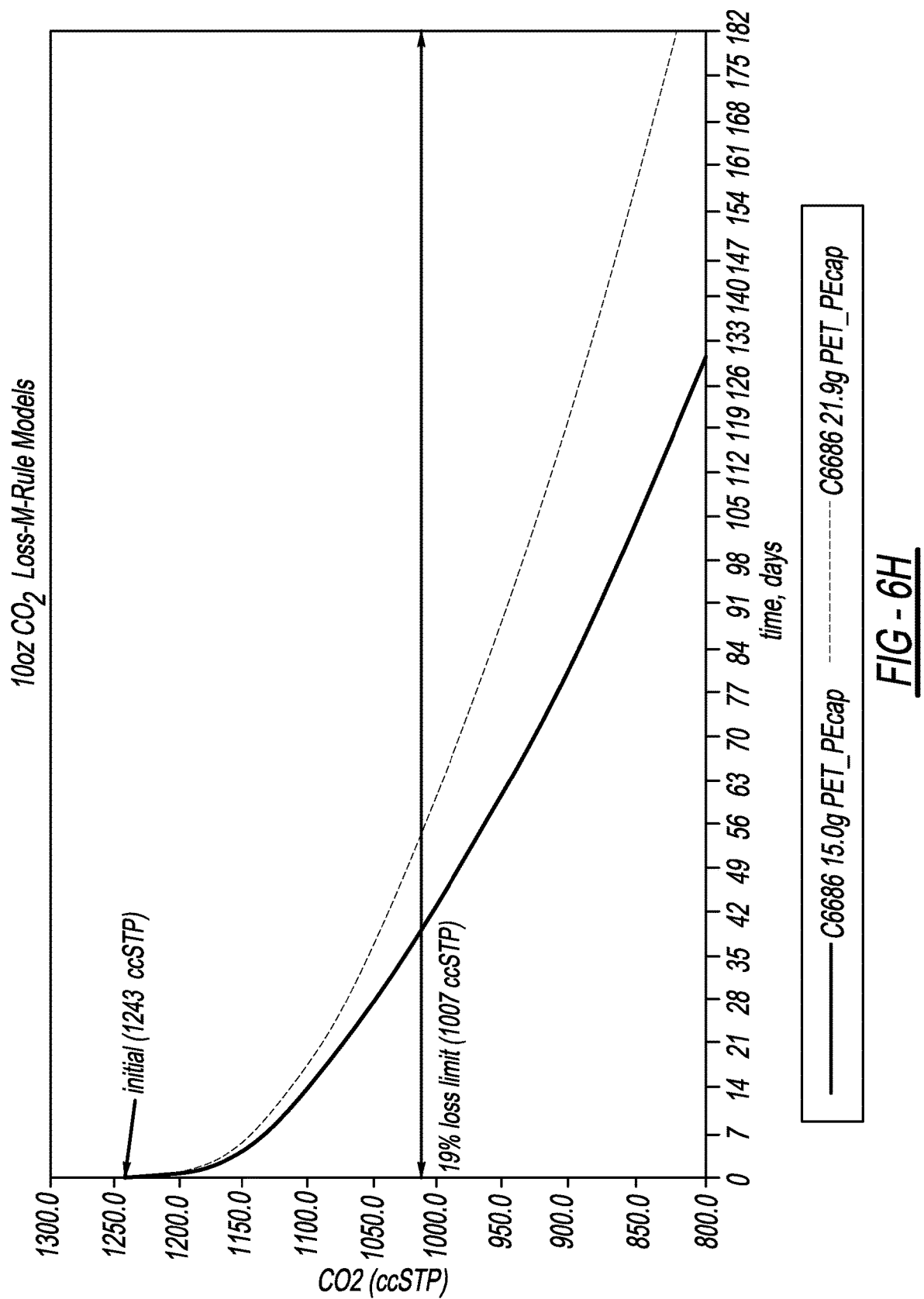

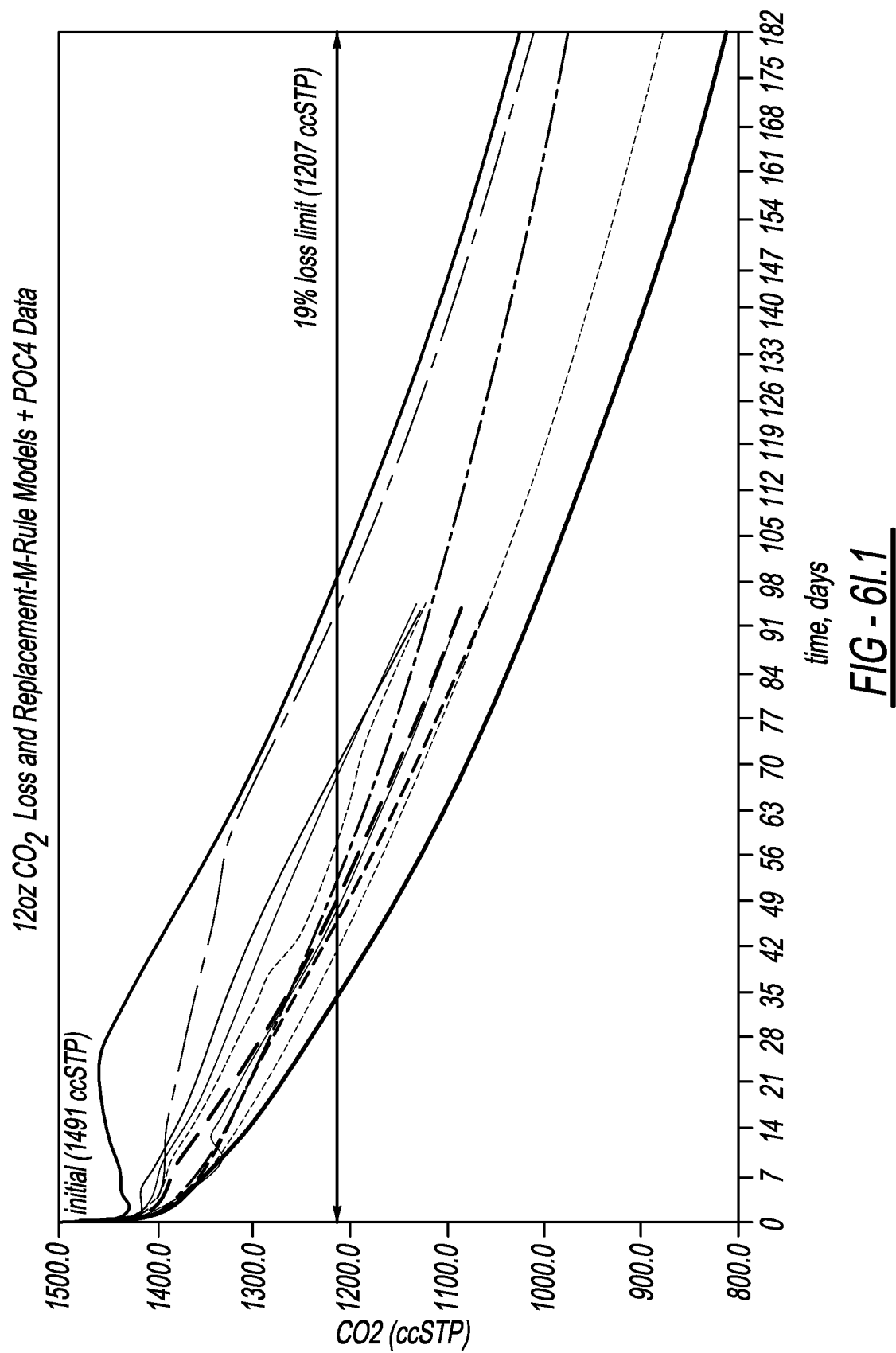
FIG - 61.1

———— C5084 15.0g PET_PEcap   --------- C2341 19.1g PET_PEcap
———— 16.8g PET+Gen3 cap   ———— 16.8g PET+LS1 sachet
— — — 16.8g PET+V9S2 sachet   ———— 16.8g PET+V18S1 sachet —— - —— 16.8g PET+Gen1 cap   — - — 16.8g PET+Gen2 cap
— — — — 16.8g PET+LS2 sachet   --------- 16.8g PET+V9S1 sachet
———— 16.8g PET+V18S2 sachet

*FIG - 6I.2*

———— C504 16.8g PET_PEcap   --------- C2341 19.1g PET_PEcap
—— — —— 16.8g PET+Gen2 cap   ———— 16.8g PET+Gen3 cap
—— - - —— 16.8g PET+Gen1 cap

*FIG - 6J.2*

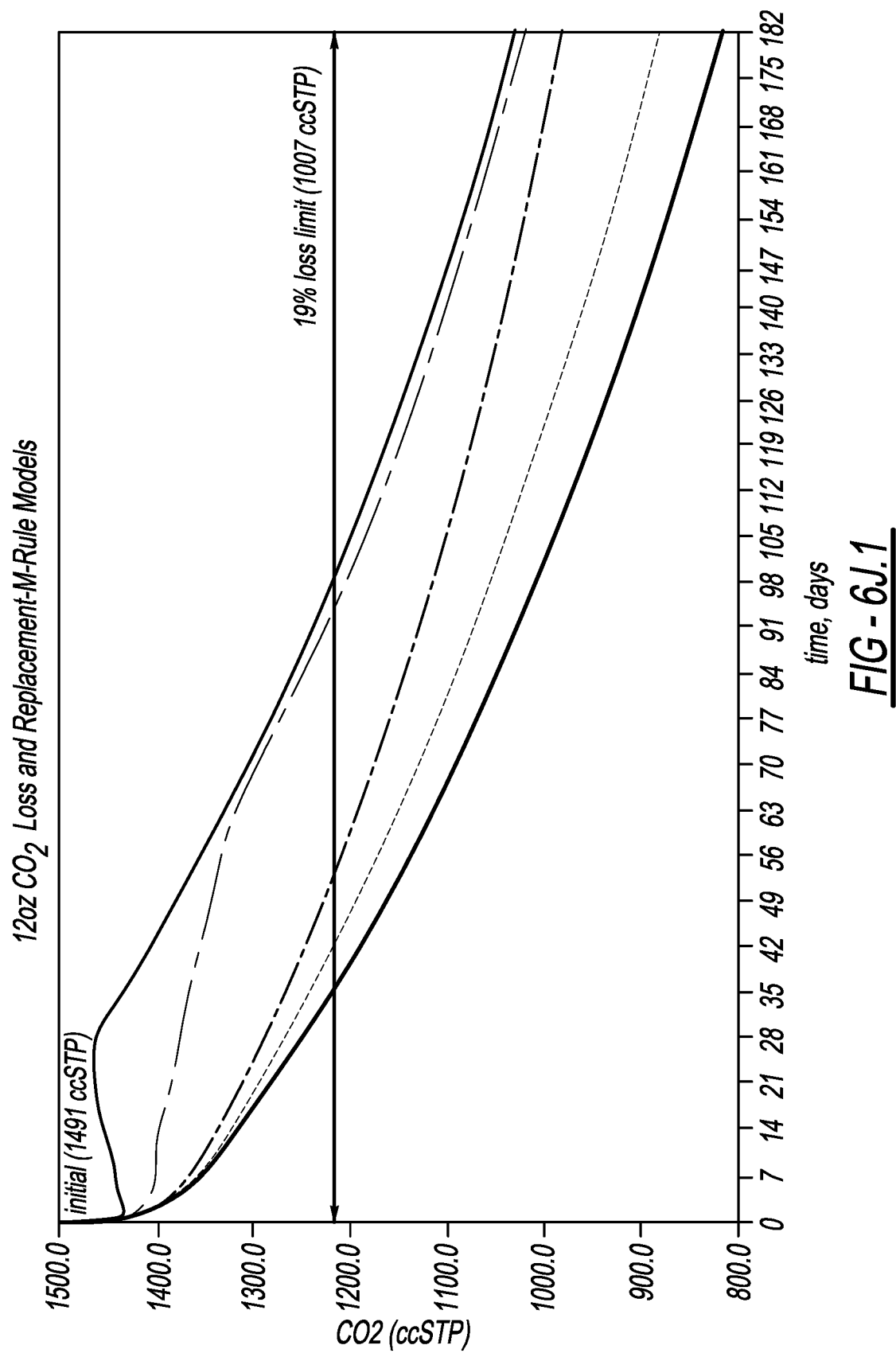
FIG - 6J.1

CO₂ GENERATOR SYSTEM FOR CARBONATED BEVERAGE CONTAINERS

CROSS REFERENCE TO RELATED APPLICATIONS

This application is a U.S. National Phase Application under 35 U.S.C. 371 of International Application No. PCT/US2017/064877 filed on Dec. 6, 2017, which claims the benefit of U.S. Provisional Application No. 62/430,659, filed on Dec. 6, 2016. The entire disclosures of the above applications are incorporated herein by reference.

FIELD

The present disclosure relates to a carbon dioxide ($CO_2$) generator for carbonated beverage containers.

BACKGROUND

This section provides background information related to the present disclosure, which is not necessarily prior art.

While current polymeric carbonated soda containers are suitable for their intended use, they are subject to improvement. For example, over extended periods of storage time carbon dioxide may permeate out from within such containers, thereby causing the beverage therein to become "flat." An improved carbon dioxide generating system for polymeric carbonated soda containers would therefore be desirable. The present teachings advantageously include a carbon dioxide generator system that is able to extend the shelf life of carbonated soda, for example, by replacing carbon dioxide that has escaped from within the container with a controlled release of carbon dioxide from a carbon dioxide generator.

SUMMARY

This section provides a general summary of the disclosure, and is not a comprehensive disclosure of its full scope or all of its features.

The present teachings provide for a closure for a container. The closure includes a carbon dioxide emitter, and a release rate control layer that is configured to control release of carbon dioxide from the carbon dioxide emitter into the container when the closure is coupled to the container.

The present teachings also include for a method for providing a closure for a container with a carbon dioxide emitter. The method includes the following: identifying a volume of the closure; determining an amount of carbon dioxide to be released by the carbon dioxide emitter for extending a shelf life of a product stored within the container; determining a diameter of the carbon dioxide emitter based on dimensions of the closure; determining a thickness of the carbon dioxide emitter for producing the determined amount of carbon dioxide to be released by the carbon dioxide emitter; determining carbon dioxide release lag time and release rate based on the volume of the container, the amount of carbon dioxide to be released, and the diameter of the carbon dioxide emitter; forming the carbon dioxide emitter by direct compression or injection molding; inserting the carbon dioxide emitter into a bore of the closure; determining copolymer with desired percentage of vinyl acetate to include with a release rate control layer configured to control release of carbon dioxide into the container from the carbon dioxide emitter; and over-molding the release rate control layer onto the carbon dioxide emitter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 3 is a cross-sectional view of the closure of FIG. 1 in accordance with another embodiment of the present teachings;

Figure 1:
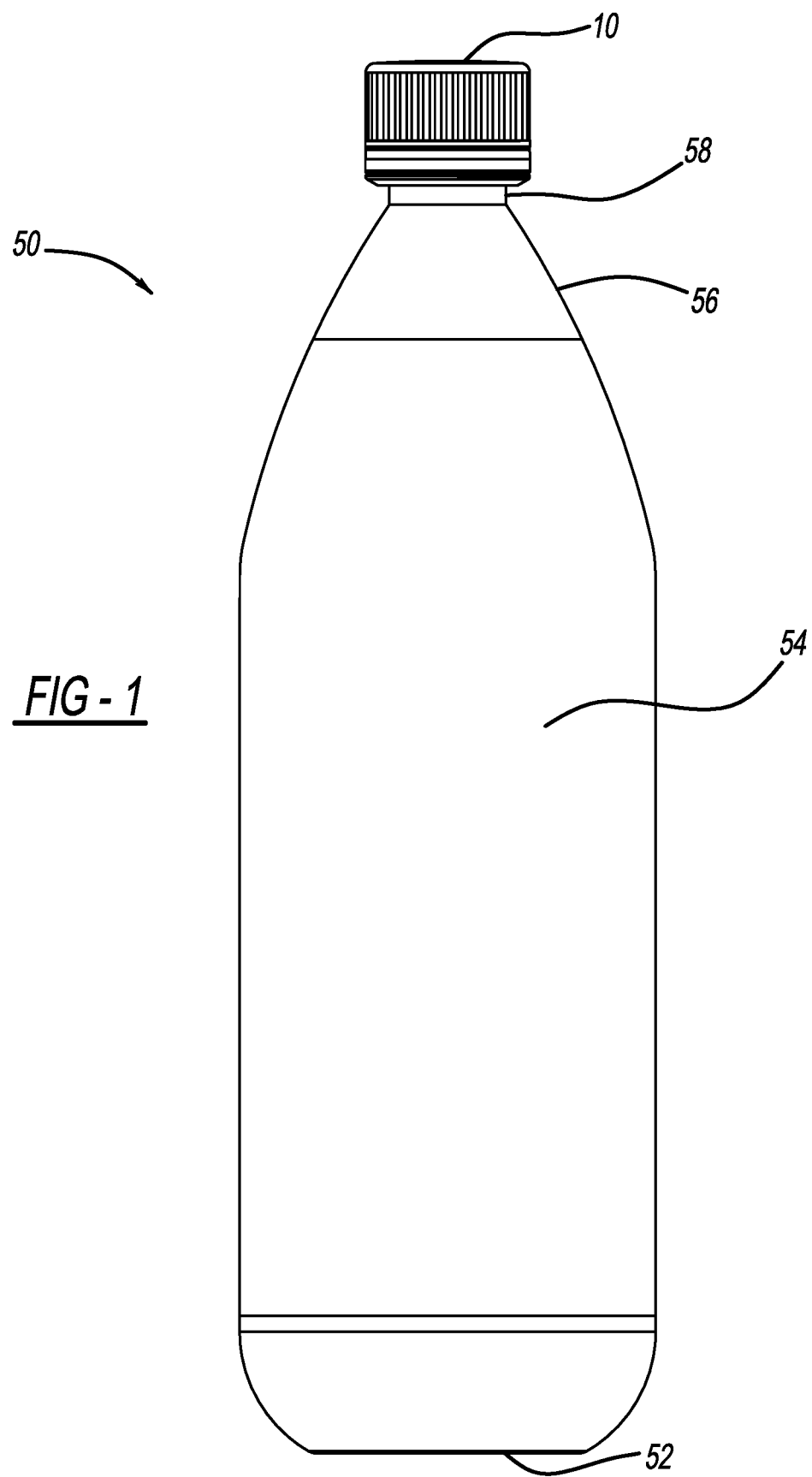
FIG. 1 is a side view of a container and a closure according to the present teachings.
Figure 5:
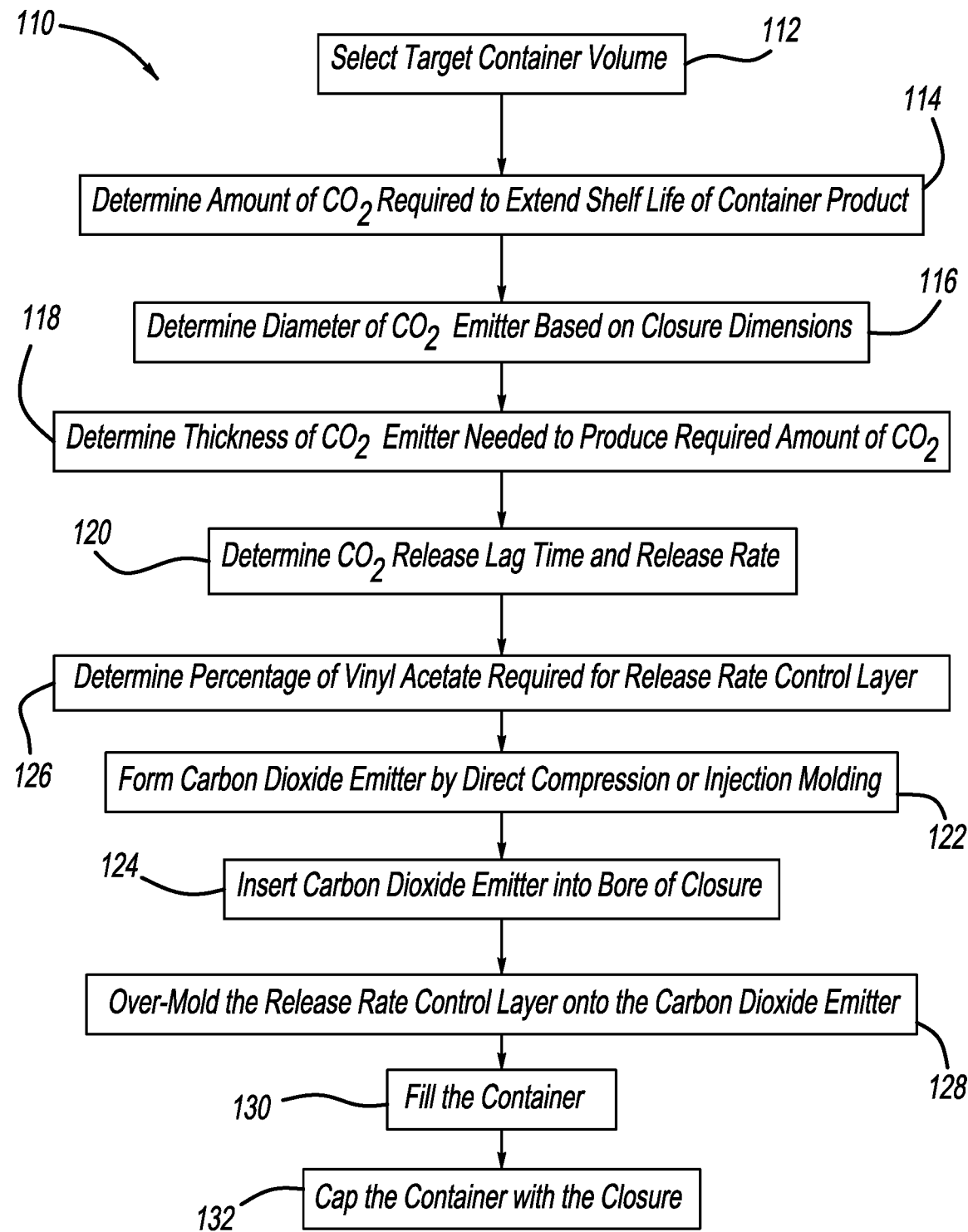
Figure 6C:
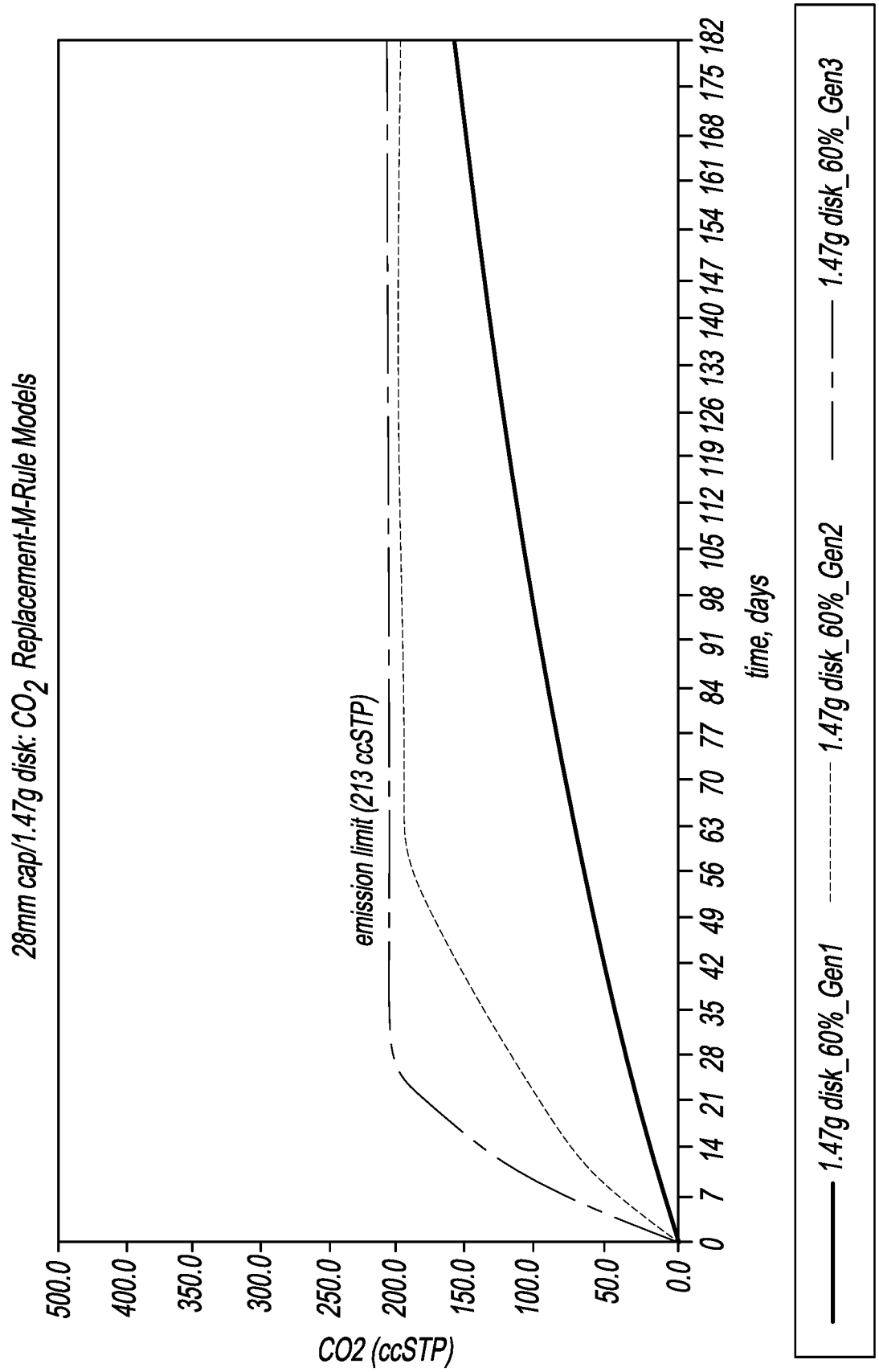
Figure 6D:
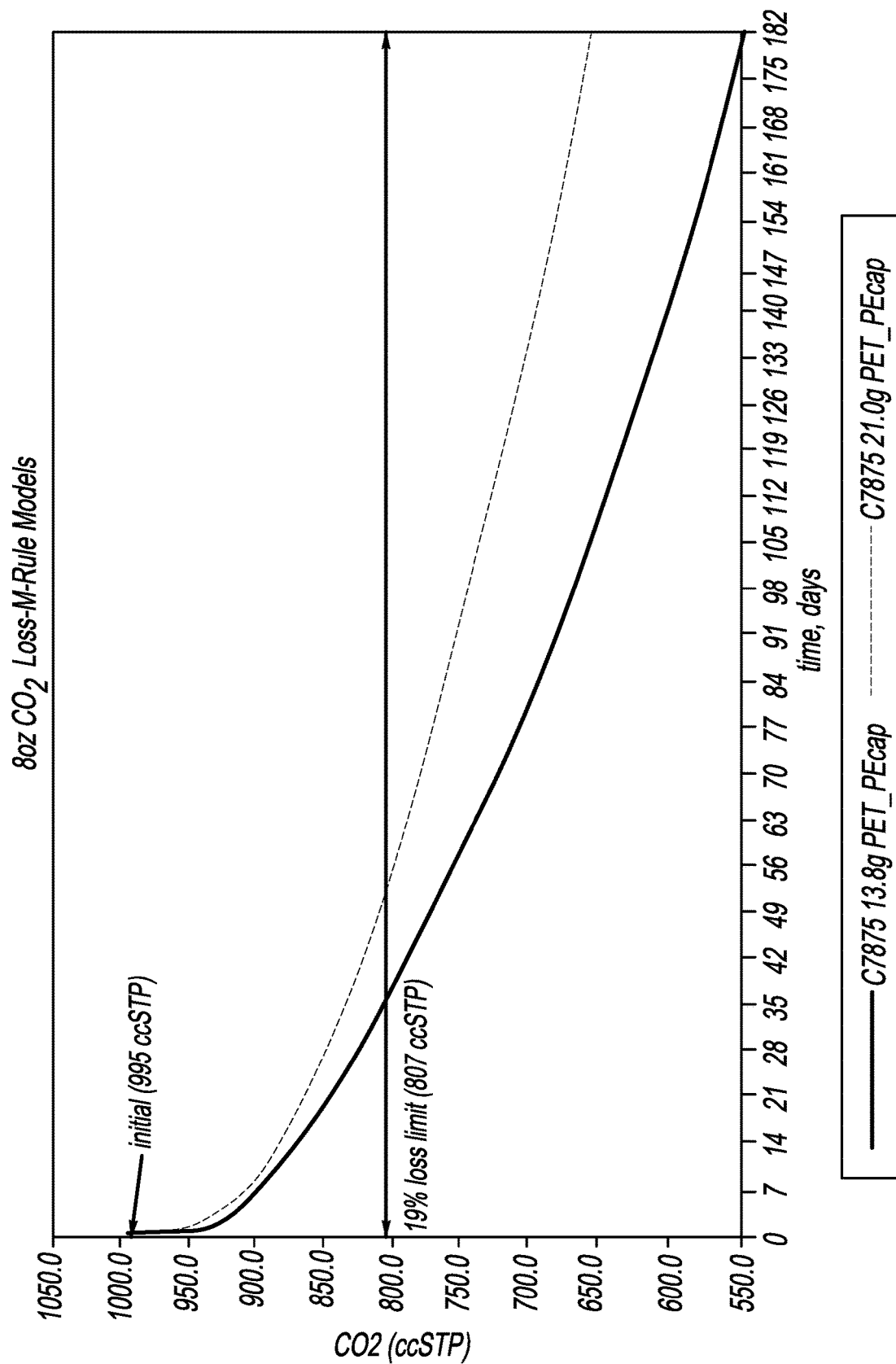
Figure 6G:
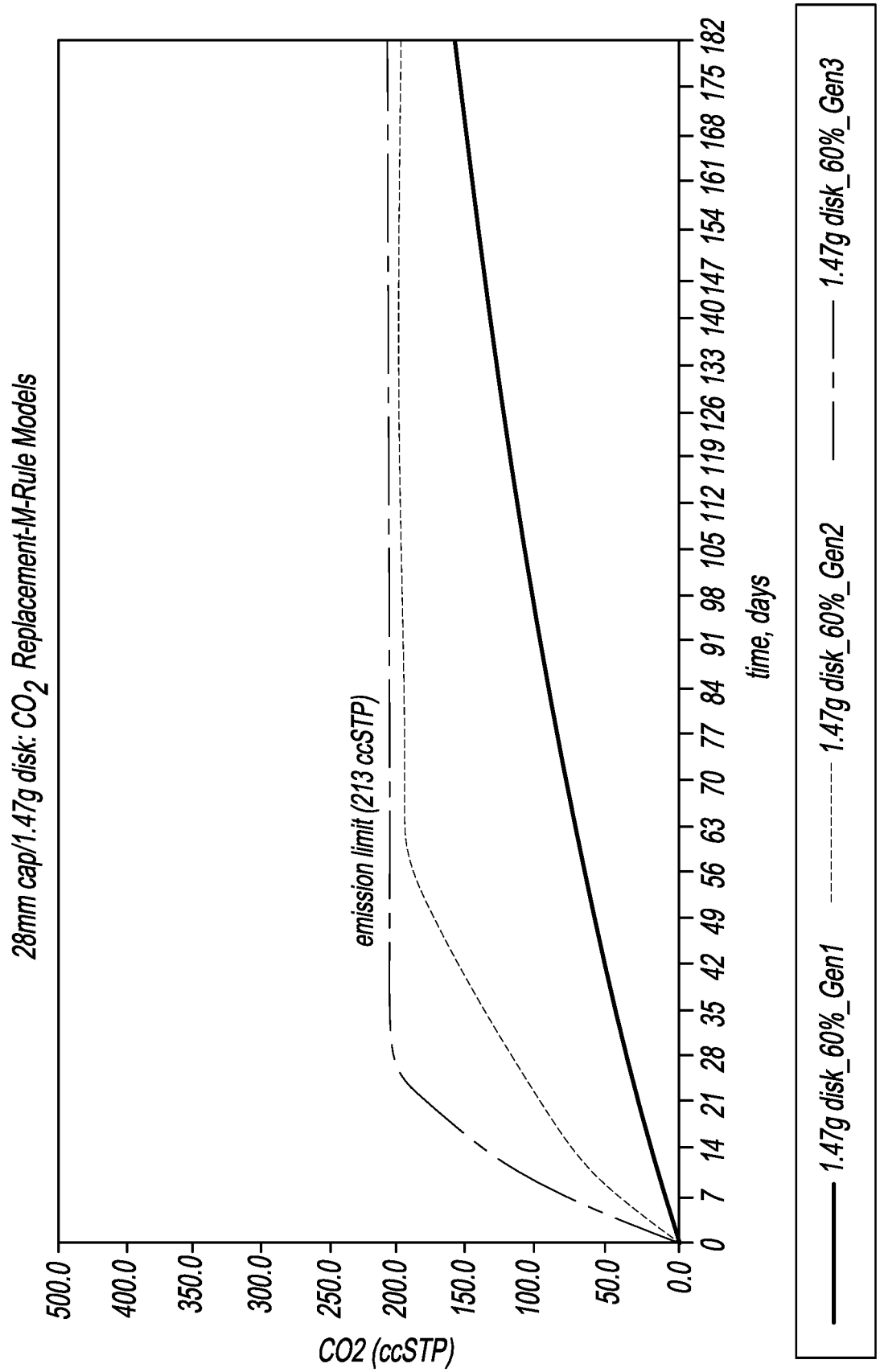
Figure 6K:
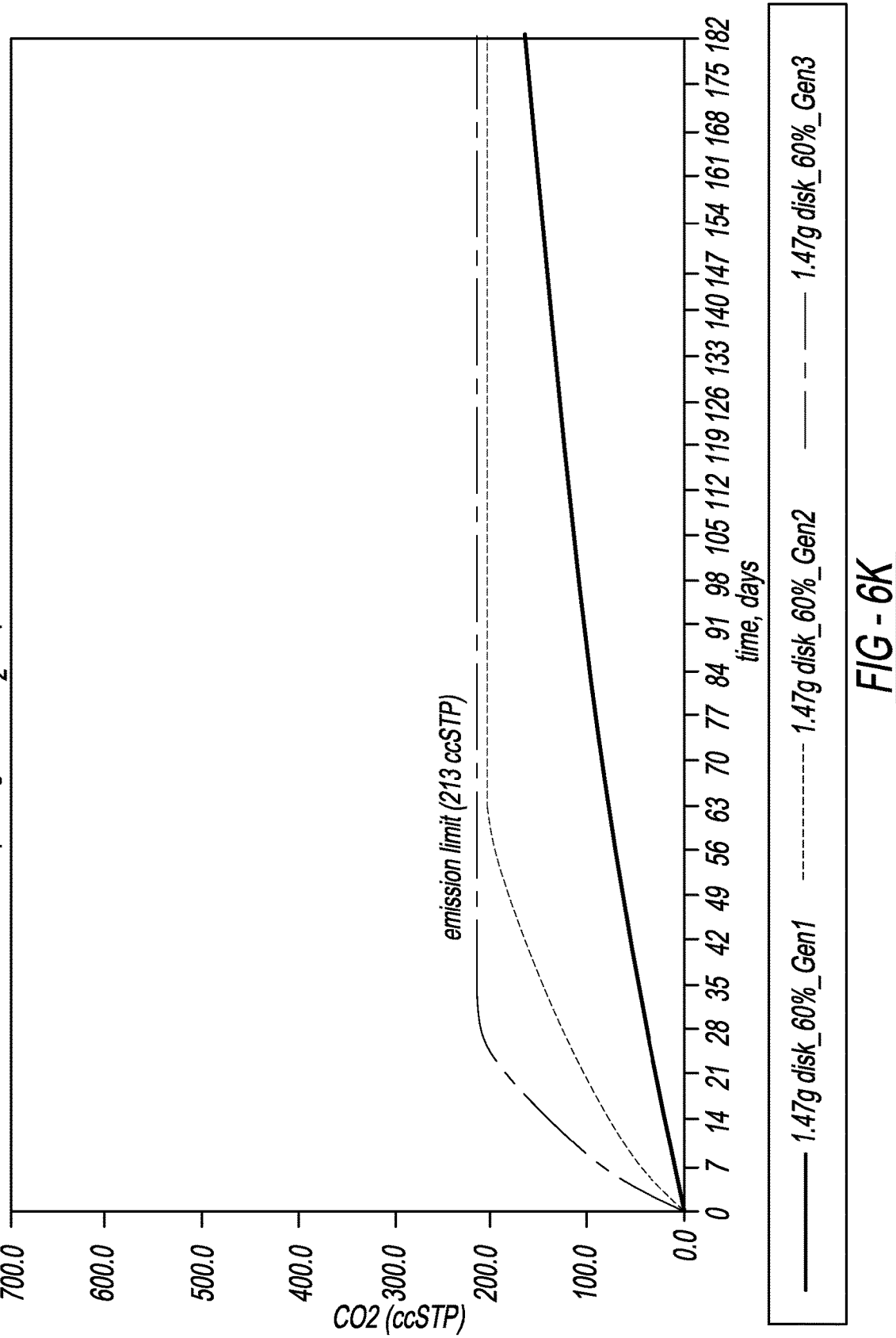
Figure 6L:
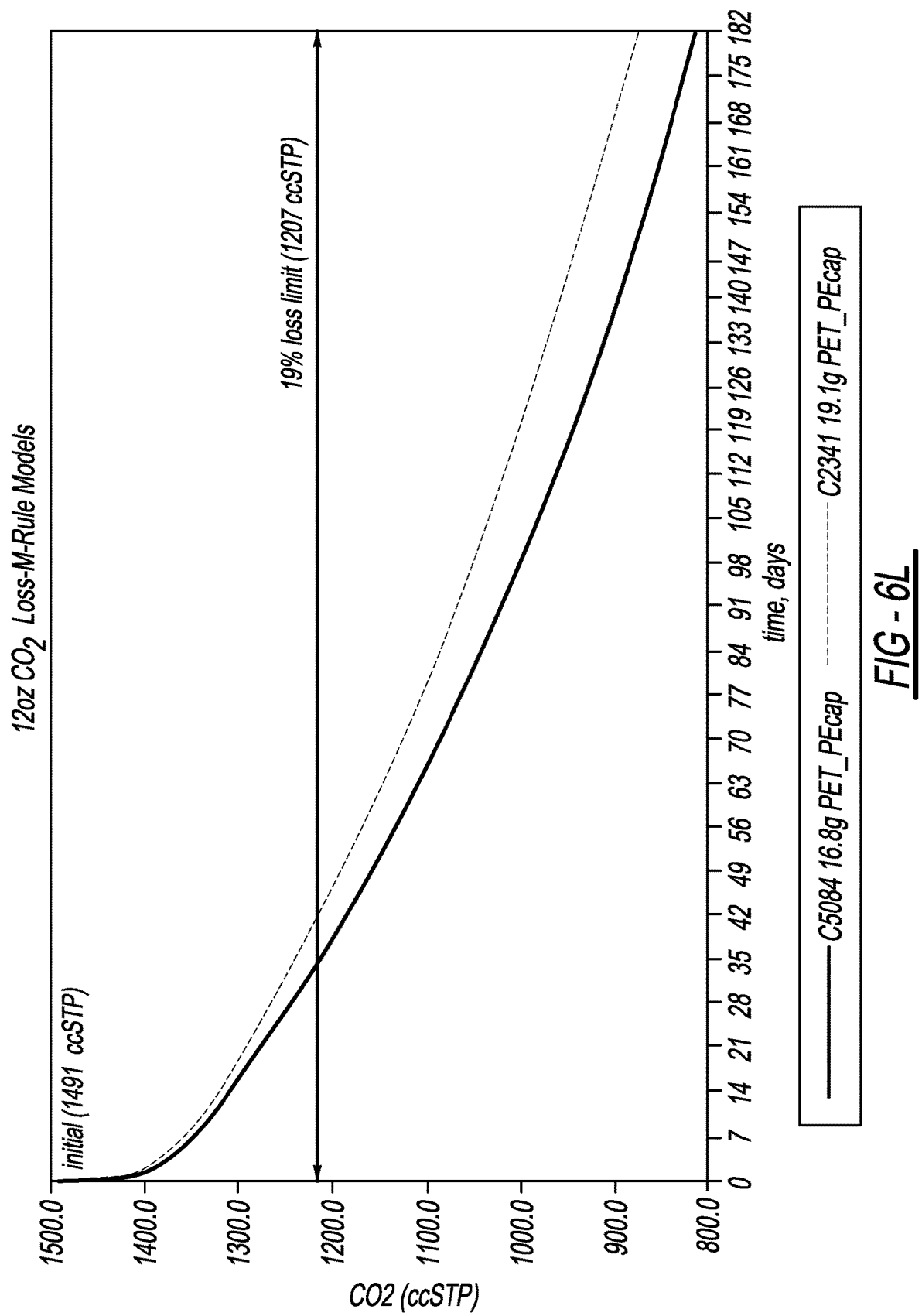
Figure 8:
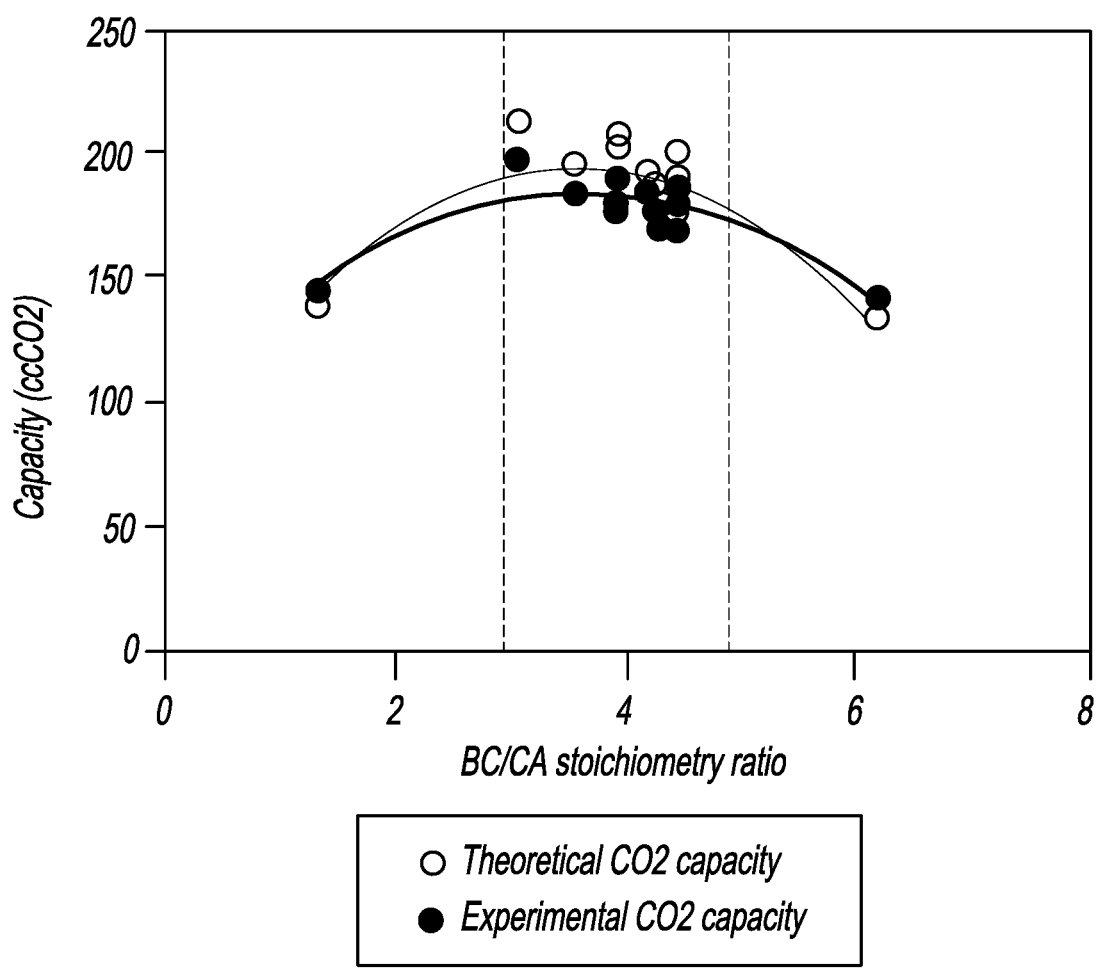

FIGS. 4A, 4B, 4C.1, 4C.2, and 4D include exemplary material compositions for a carbon dioxide emitter according to the present teachings for the closure of FIG. 1;

FIG. 5 illustrates a method according to the present teachings for providing a closure for a container, the closure including a carbon dioxide emitter and a release rate control layer;

FIGS. 6A.1, 6A.2, 6B.1, 6B.2, 6C, 6D, 6E.1, 6E.2, 6F.1, 6F.2, 6G, 6H, 6I.1, 6I.2, 6J.1, 6J.2, 6K, 6L, illustrate carbon dioxide loss and generation for various containers and closures according to the present teachings;

FIGS. 7A, 7B, 7C, 7D, 7E, 7F, 7G, and 7H illustrate control of carbon dioxide release time and release rate by modifying percentage of ethylene-vinyl acetate present in a release rate control layer of the closure, and modifying thickness of the release rate control layer;

FIG. 8 illustrates $CO_2$ generation capacity of formulation with varying BC/CA stoichiometry ratios for a container according to the present teachings.

Figure 9:
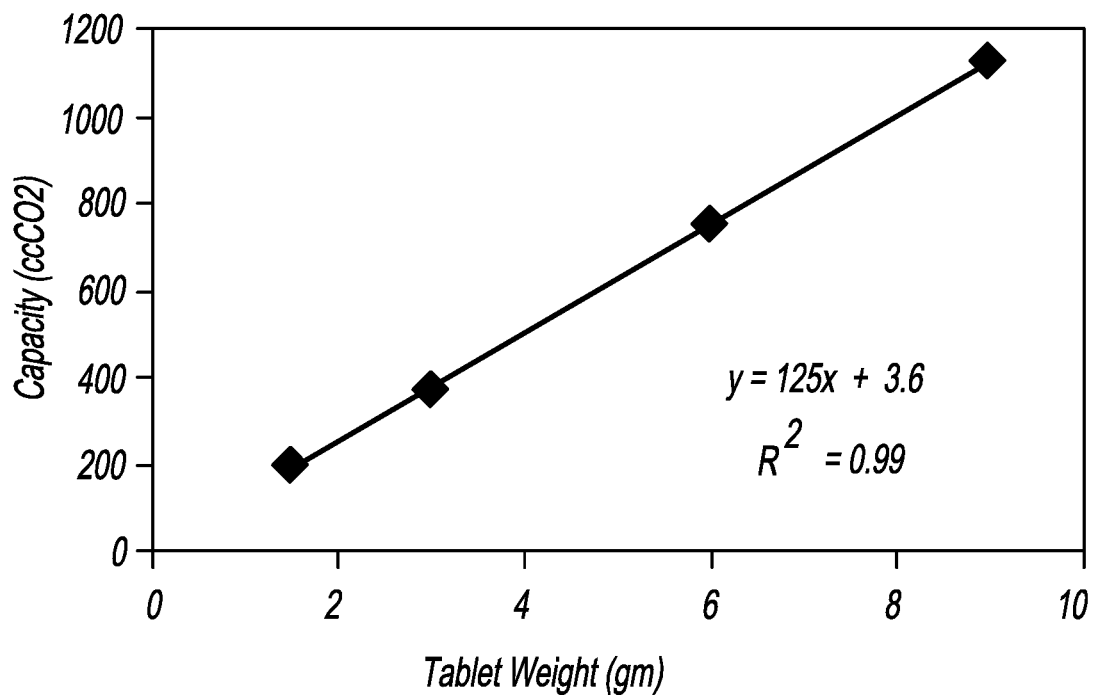
Figure 10:
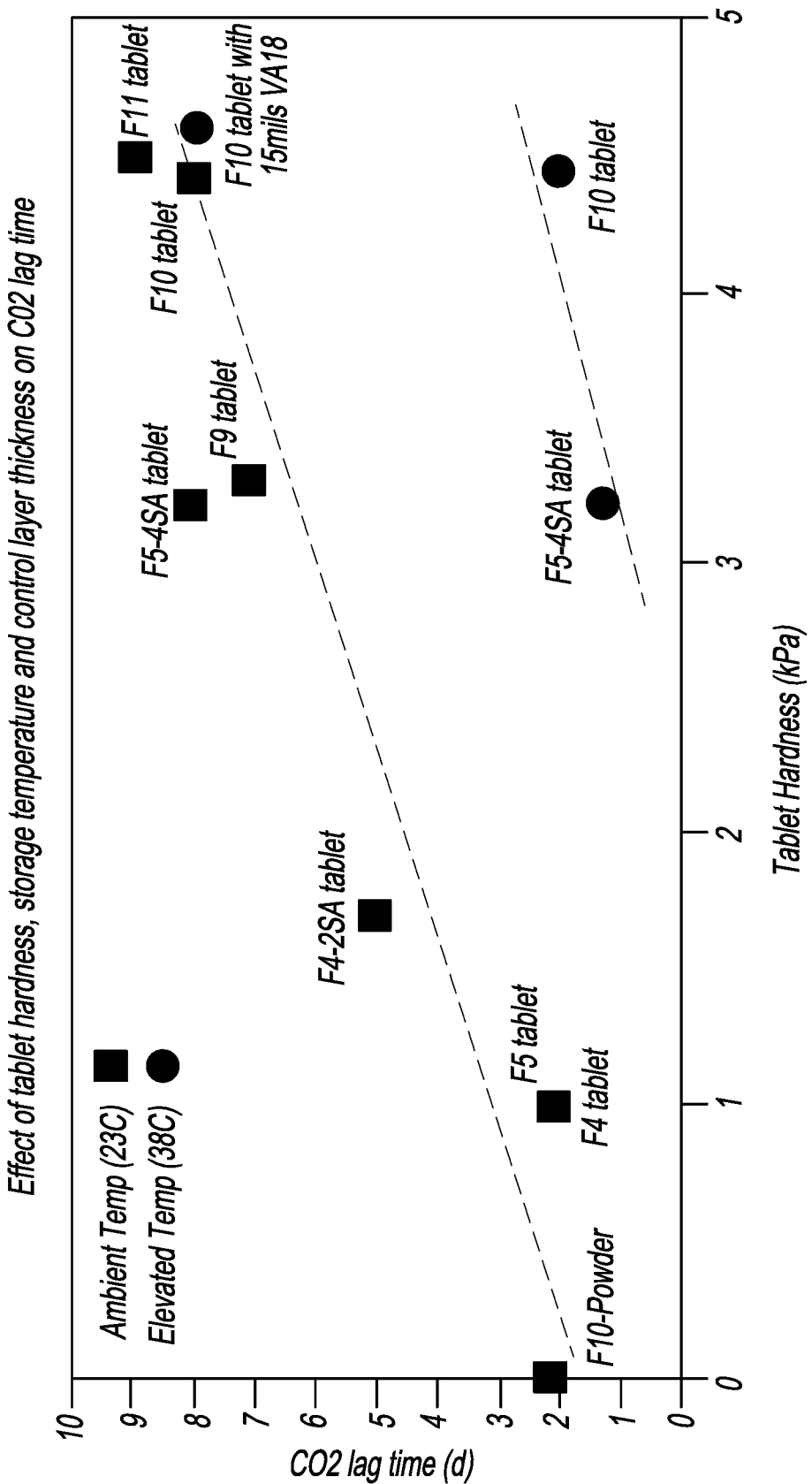
Figure 11:
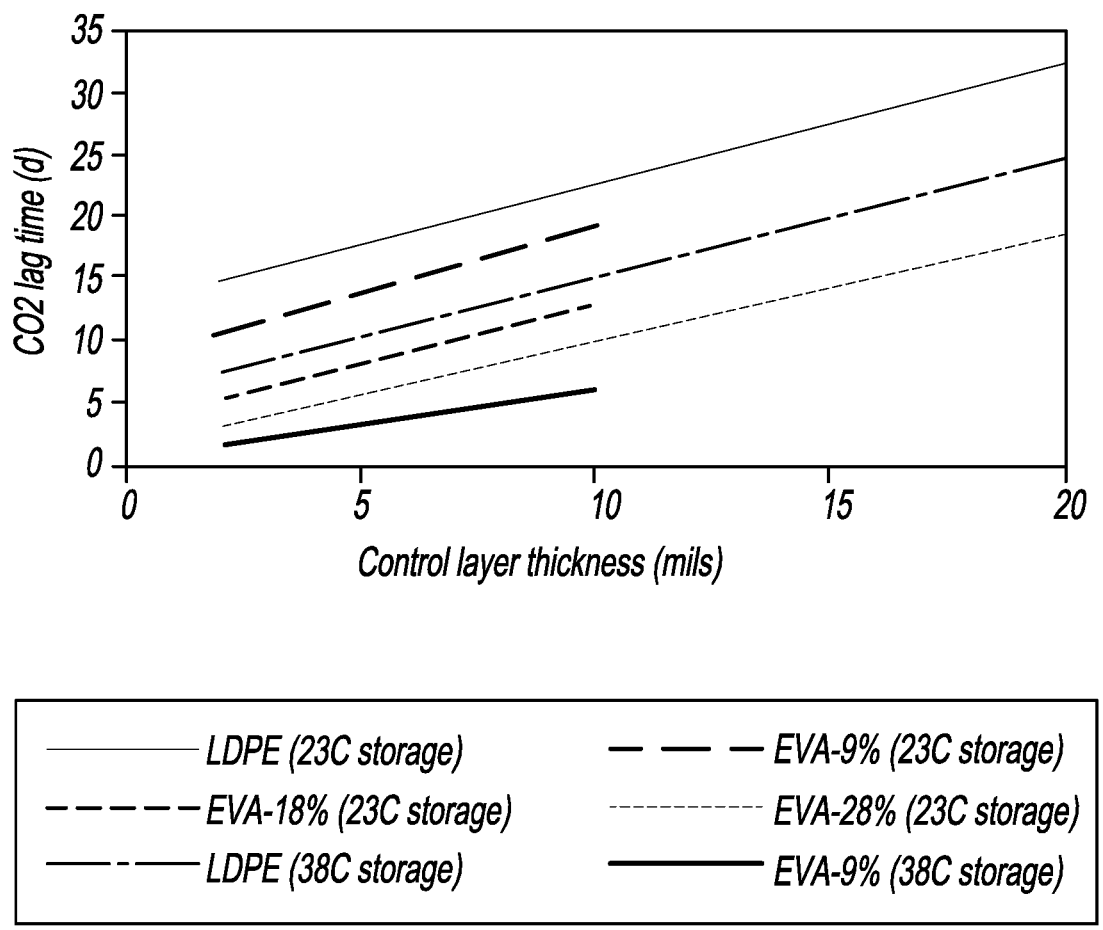
Figure 12:
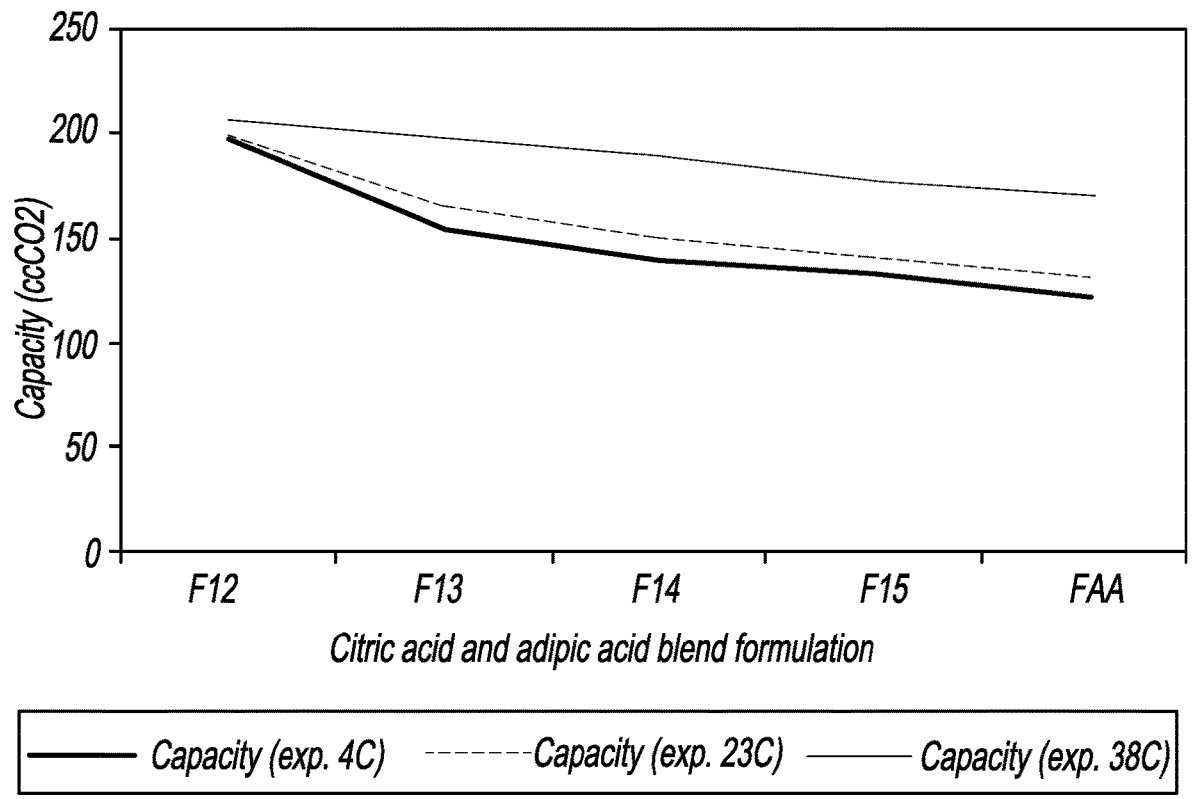
Figure 13:
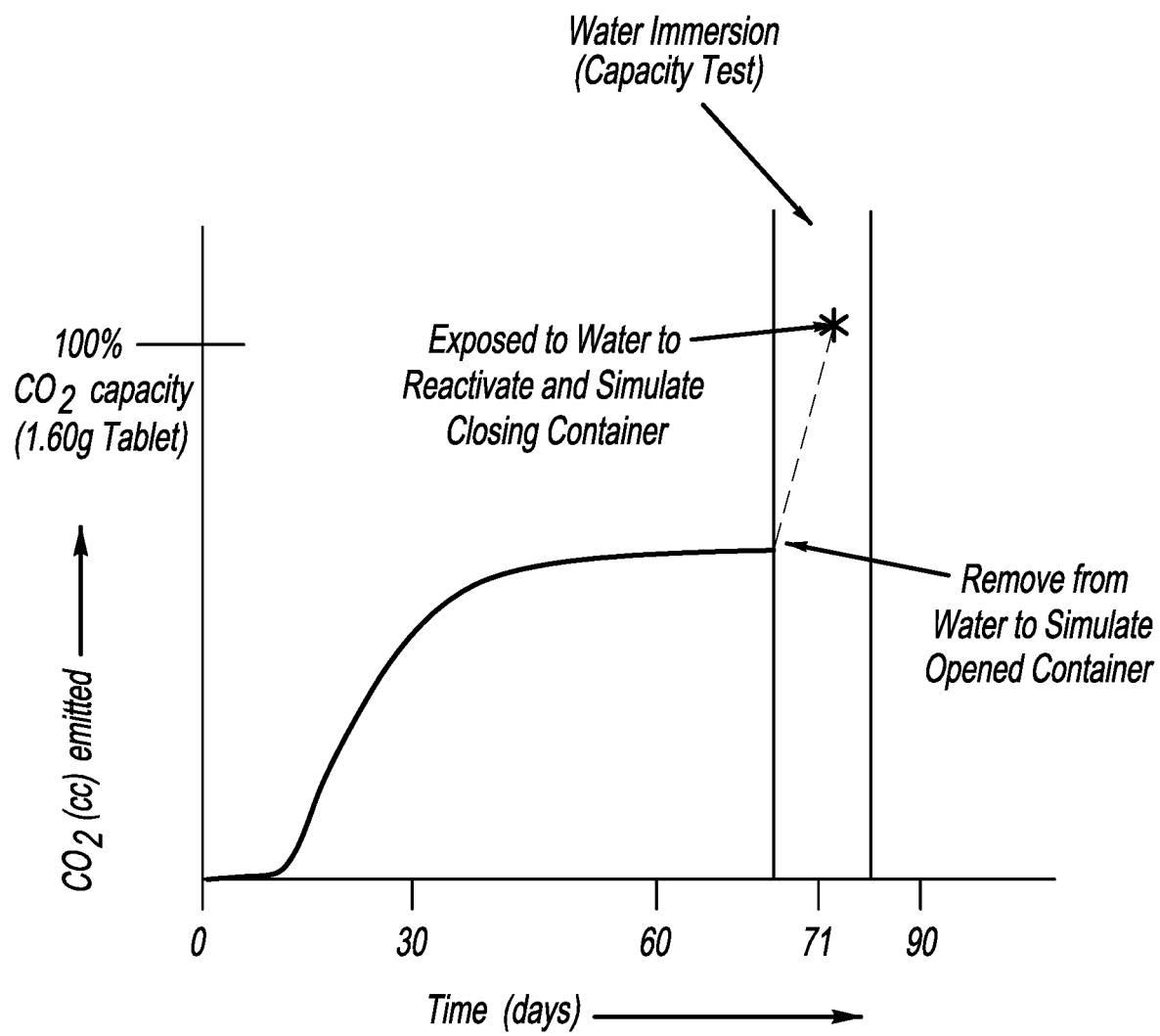

FIG. 9 illustrates experimental $CO_2$ capacity of a test formulation with increasing weight;

FIG. 10 illustrates effect of tablet hardness, storage temperature, and control layer thickness on $CO_2$ lag time;

FIG. 11 illustrates effect of control layer type, control layer thickness, and storage temperature on $CO_2$ lag time;

FIG. 12 illustrates effect of acid mixture (citric and adipic acid) and temperature effect on formulation $CO_2$ capacity; and FIG. 13 illustrates amount of $CO_2$ emitted over time from a container according to the present teachings.

Corresponding reference numerals indicate corresponding parts throughout the several views of the drawings.

DETAILED DESCRIPTION

Example embodiments will now be described more fully with reference to the accompanying drawings.

With initial reference to FIG. 1, a closure 10 in accordance with the present teachings is illustrated. The closure 10 is coupled to an opening of a container 50 in order to seal the container 50 closed. The container 50 can be any suitable container, such as any container suitable for storing a carbonated product therein, such as carbonated soda drinks. The container 50 is also suitable for storing any suitable alcoholic beverage, such as any suitable flavored alcoholic beverage. The container 50 generally includes a base 52, sidewall 54 extending from the base 52, a shoulder 56, and a neck 58, which extends to a finish portion (obscured by the closure 10 in FIG. 1) of the container 50. The finish defines an opening of the container 50.

The container 50 can be made of any suitable material, such as mono-layer polyethylene terephthalate, or any other suitable polymeric material. The container 50 can have any suitable capacity for product, such as any suitable capacity from 8 oz. to 20 oz. Specific product capacities for the container 50 include 8 oz., 12 oz., 20 oz., and 500 ml. The finish of the container 50 can define an opening of any suitable diameter, such as any suitable diameter of 18 mm.-38 mm., including diameters of 22 mm., 28 mm., 33 mm., and 38 mm.

The closure 10 advantageously provides a carbon dioxide generating system for the container 50, which extends the shelf life of product of the container 50, such as carbonated soda drinks. After the container 50 is filled and capped with the closure 10, the closure 10 slowly generates supplemental carbon dioxide for a period of time to offset the loss of carbon dioxide that escapes out through the container 50, such as through the base 52, sidewall 54, and shoulder 56 of the container 50. The carbon dioxide generating system of the closure 10, which is described further herein, is particularly well suited for polyethylene terephthalate (PET) containers ranging from about 8 oz. to about 20 oz. in size due to the current shelf life of 6-7 weeks, at which time the amount of carbon dioxide within the container typically falls below acceptable consumer limits, and begins to affect product taste and quality requirements. This is in contrast to larger 2-liter sized carbonated soda drink containers having a shelf life of 12-13 weeks. The present teachings advantageously increase the working shelf life of smaller size carbonated soda drink products by about twofold, so that carbonated soda drink fillers have more time to distribute and sell carbonated products before they expire. The present teachings advantageously increase the shelf life to 10-14 weeks for carbonated products stored within containers (such as container 50) closed with the closure 10, at which time only about a 19% loss in carbon dioxide occurs, which is well within acceptable limits.

The closure 10 can be made of any suitable material, such as any suitable polymeric material or metallic material. Suitable polymeric materials include polypropylene, low-density polyethylene, and high-density polyethylene. The closure 10 can have any suitable diameter, such as any suitable diameter from 18 mm. to 38 mm., which includes 22 mm., 28 mm., 33 mm., and 38 mm.

Figure 2A:
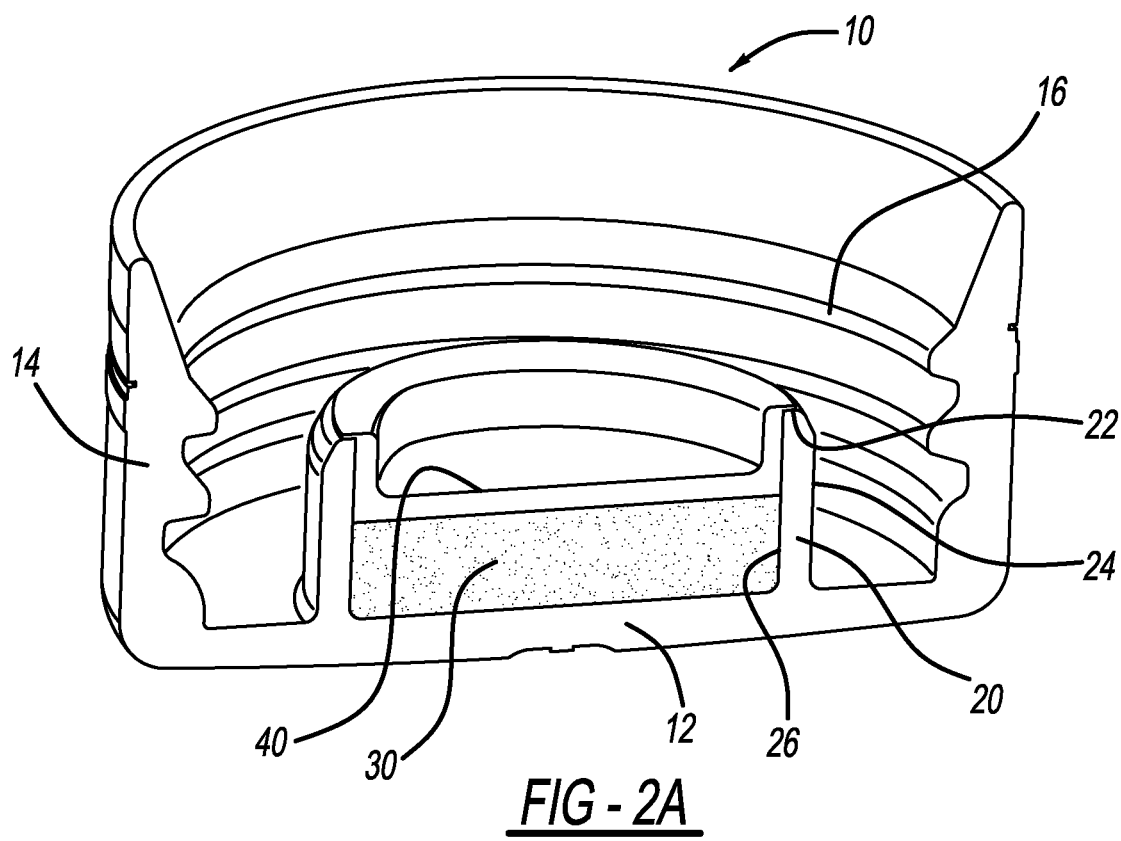
FIGS. 2A and 2B are cross-sectional views of the closure of FIG. 1.
Figure 2B:
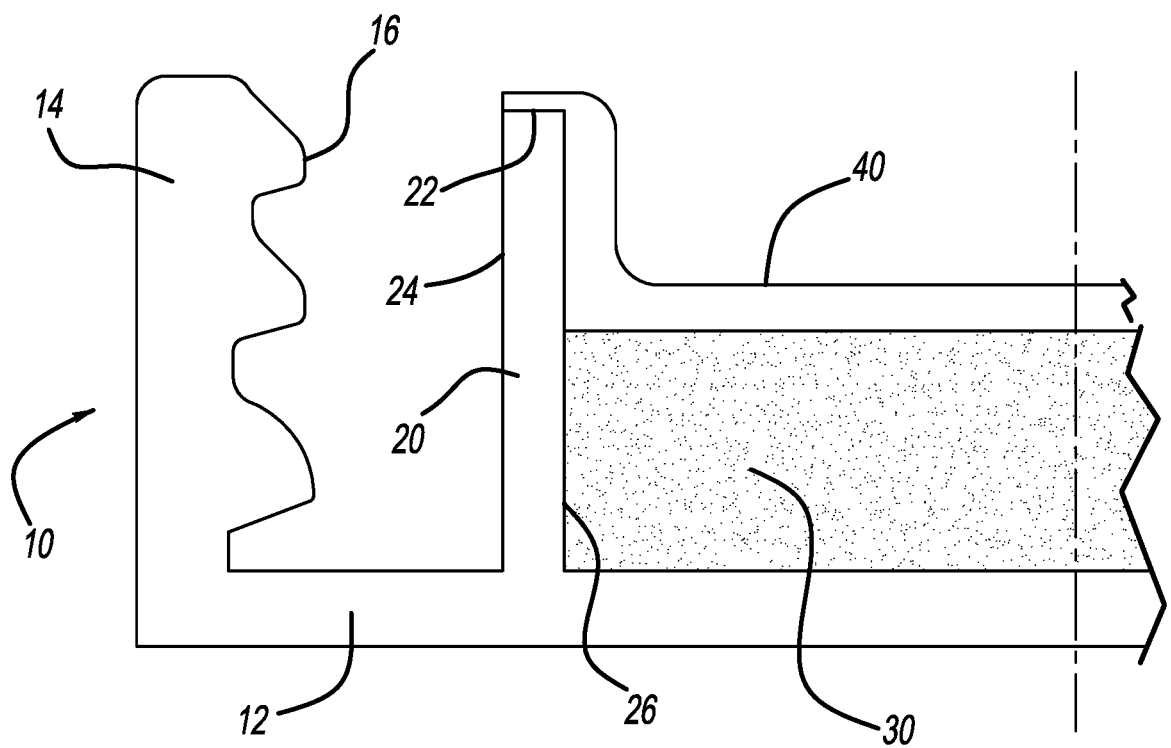

With reference to FIGS. 2 and 3, the closure 10 generally includes a base 12 and an annular wall 14 extending from the base 12. Extending from an inner surface of the annular wall 14 are internal threads 16, which are configured to couple with threads of the container 50 in order to secure the closure 10 to the container 50 and seal the container 50 closed. Also extending from the base 12 is a closure flange 20. The closure flange 20 includes a distal surface 22 at an end of the closure flange 20 that is distal to the base 12. The closure flange 20 further includes an outer surface 24, which is opposite to the internal threads 16. The outer surface 24 is configured to contact and seal against an inner surface of the finish portion of the container 50. The closure flange 20 is generally an annular flange that defines a closure bore 26. The closure bore 26 can be any suitable height and defined in any other suitable manner as well. For example, the closure bore 26 can be defined by a recess within the base 12, or by any other suitable member extending from the base 12.

Seated within the closure bore 26 is a carbon dioxide emitter 30, and a release rate control layer 40, which is arranged to control release of carbon dioxide from the carbon dioxide emitter 30 into the container 50 when the closure 10 is coupled to the container 50, as explained further herein. The release rate control layer 40 can be overmolded onto the carbon dioxide emitter 30, or arranged on the carbon dioxide emitter 30 in any other suitable manner. The release rate control layer 40 can be confined to within the closure bore 26, or can extend out from within the closure bore 26, such as to and/or across the distal surface 22 of the closure flange 20. As shown in FIG. 3, base 12 may also have a suitable sealing liner 60 attached to the inner surface of the base 12. The carbon dioxide emitter 30 can be placed directly on the sealing liner 60 and overmolded with the control layer 40 to hermetically attach to the sealing liner 60.

The carbon dioxide emitter 30 can be formed of any suitable material, such as blends of bicarbonate base as shown in the table of FIG. 4A, an acid catalyst selected from the group of citric acid, phosphoric acid, tartaric acid, L-malic acid, adipic acid, fumaric acid, and stearic acid, as shown in table 4B, and polyvinyl pyrrolidone (PVP). Different types of acids can be combined to "control the reaction" under different temperature and storage condition to maximize shelf life extension. For example, relatively slower reaction kinetics driven by higher pKa acids, such as adipic acid, will trigger reaction at higher temperature while they are dormant in lower temperature; thus blends of acids will be able to control reaction kinetics under different temperature conditions as shown in FIG. 12. The carbon dioxide emitter 30 can also be made of a material blend including bicarbonate, acid, and microcrystalline cellulose (MC). The carbon dioxide emitter 30 can be formed in any suitable manner, such as by direct compression or injection molding. The carbon dioxide emitter 30 can be formed of any suitable size and shape to fit within the closure bore 26. For example and as illustrated, the carbon dioxide emitter 30 can be shaped as a disc or tablet that is sized to fit into the diameter and depth of the closure bore 26. The carbon dioxide emitter 30 may further include any suitable dry lubricant, such as magnesium stearate. The basic reaction to generate carbon dioxide from the carbon dioxide emitter 30 is as follows:

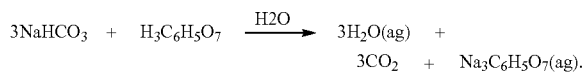

$$3NaHCO_3 + H_3C_6H_5O_7 \xrightarrow{H2O} 3H_2O(ag) + 3CO_2 + Na_3C_6H_5O_7(ag).$$

The PVP and MC are humectants, which provide the carbon dioxide emitter 30 with an increased affinity to water. The BC can be any suitable bicarbonate, such as a bicarbonate selected from the family of sodium, potassium, etc. The BC can be provided in any suitable generating capacity, such as at 267 cc's $CO_2$/g, as shown in FIG. 4A. FIG. 4A shows the $CO_2$ generating capacity of additional bicarbonate compounds as well. FIG. 4A gives the wt % of $CO_2$ in various bicarbonates, the calculated cc[STP]/g produced from each bicarbonate, and includes comments on stability and food clearance. The stability and food clearance provide context with respect to why one would select a given compound. The BC can be provided at any suitable weight to provide the desired shelf-life extension independent of the diameter and depth of the carbon dioxide emitter 30. The carbon dioxide emitter 30 can optionally include additives, such as an optical tracer, which can be used for quality control purposes. FIGS. 4B and 4C include exemplary material compositions for the carbon dioxide emitter 30 according to the present teachings, including the percentage of each ingredient.

With respect to FIGS. 4C.1 and 4C.2, a list of $CO_2$ generator formulations is provided, which include bicarbonate, citric acid, lubricant (magnesium stearate and stearic acid) and humectant (MCC and PVP). MCC can be extended to more modified cellulose types including HPC (hycroproxpropyl cellulose), HPMC (hycroproxpropyl methyl cellulose) etc. Calculations of $CO_2$ generation capacity of formulations is based on citric acid as limiting reagent.

FIG. 9 shows that the $CO_2$ generating capacity can be increased by increasing the tablet weight. The carbon dioxide emitter 30 can optionally be coated to help strengthen and prevent unwanted dust as the carbon dioxide emitter 30 is handled and inserted into the closure bore 26. Suitable coating materials include Acrylate copolymers, Eudragit E, Cellulosic polymers, carboxymethylcellulose sodium, hydroxypropylcellulose, hydroxypropylmethylcellulose, methylcellulose, polyethyleneglycols, povidone, Methacrylic acid copolymer, Eudragit L and S® (anionic copolymers), cellulose acetate phthalate, hydraxypropyl methylcellulose phthalate, polyvinyl acetate phthalate, ethyl cellulose, Cellulose acetate phthalate, Polyvinyl acetate phthalate, and sugar. FIG. 9 shows that any amount of $CO_2$ (as required to increase the shelf-life) can be generated by adjusting the weight of acid and base in the formulation.

FIG. 10 illustrates the effect of tablet hardness, storage temperature, and control layer thickness on $CO_2$ lag time. Tablet hardness, storage temperature, control layer thickness, or their combinations can be used to tune $CO_2$ lag time.

FIG. 11 illustrates effect of control layer type and thickness, and storage temperature, on $CO_2$ lag time. A combination of control layer with various types and thicknesses and storage temperature can be used to tune $CO_2$ lag time.

FIG. 12 illustrates effect of acid mixture (citric and adipic acid) and temperature effect on formulation $CO_2$ capacity.

The release rate control layer 40 includes any suitable ethylene-vinyl acetate (EVA) copolymers, low-density polyethylene (LDPE), high density polyethylene (HDPE), polyvinyl acetate (PVA). LDPE provides relatively slower reaction times, and PVA provides relatively faster reaction times. Any suitable percentage of vinyl acetate (VA) can be included with the release rate control layer 40, such as any suitable percentage of VA within commercially available ranges, which includes 0%-33% VA.

An EVA composition of the release rate control layer 40 of from 0% to 33% VA determines material constant $\alpha = P_{CO2}/P_{H2O}$. The material constant $\alpha$ controls permeability of the release rate control layer 40 to water vapor, and thus controls reactions at the carbon dioxide emitter 30 by controlling water vapor access. The material constant $\alpha$ also controls the release rate of carbon dioxide from the carbon dioxide emitter 30 into the container 50 by controlling permeability of the release rate control layer 40 to carbon dioxide.

The percentage of VA included with the release rate control layer 40, and the thickness of the release rate control layer 40, can be adjusted to control permeation of active carbon dioxide from the carbon dioxide emitter 30 and through the release rate control layer 40, which has an effect on start time lag and release rate of carbon dioxide into the container 50, as shown in FIGS. 10 and 11. The start time lag of carbon dioxide release is controlled by the thickness and material composition of the release rate control layer 40 using the following time lag equation: $t_L = L^2/6D$ (where L=layer thickness, and D=diffusion constant of the selected EVA composition).

The release rate control layer 40 can be applied over the carbon dioxide emitter 30 in any suitable manner, such as by injection molding, overmolding, dual shot molding, compression molding, ultrasonic welding, heat sealing, induction sealing, solvent bonding, etc. The release rate control layer 40 is arranged in any suitable manner to encapsulate the carbon dioxide emitter 30 and provide a hermetic seal with the closure bore 26, or any recess that the carbon dioxide emitter 30 may be seated within.

The release of $CO_2$ can only be achieved by constant moisture vapor exposure. The carbon dioxide emitter 30 is deactivated by removing the presence of moisture vapor such as when the closure is removed from a filled container. The carbon dioxide emitter can be reactivated when re-exposed to moisture vapor such as when the closure is re-applied to a partially filled container, as shown in FIG. 13.

With reference to FIG. 5, a method for providing the closure 10 so as to release carbon dioxide into the container 50 at a desired time and rate in order to extend the shelf life of carbonated products is illustrated at reference numeral 110. With reference to block 112, the target volume of the container 50 is selected, such as 12 oz., 20 oz., 500 ml., etc. With reference to block 114, the amount of carbon dioxide required to extend the shelf life of the container product, such as to 12-14 weeks with no more than a 19% loss of carbon dioxide, is determined in any suitable manner, such as with any suitable lookup table and/or formula. FIGS. 6A-6L set forth carbon dioxide loss and generation curves for three different exemplary sized containers.

With reference to block 116, the diameter of the carbon dioxide emitter 30 is determined based on the size of the area that the carbon dioxide emitter 30 is to be seated at, such as at the closure bore 26. With reference to block 118, based on the material compositions selected for the carbon dioxide emitter 30, such as any of the compositions set forth in FIGS. 4A, 4B, and 4C, the thickness of the carbon dioxide emitter disc 30 required to produce the required amount of carbon dioxide determined in block 114 is identified. With reference to block 120, the carbon dioxide release lag time and release rate is determined based on the volume of the container 50, the amount of carbon dioxide required as determined at block 114, and the dimensions of the carbon dioxide emitter determined at block 116. FIGS. 7A-7H set forth how to control carbon dioxide release lag time (start time) and release rate by changing the % EVA and thickness of the release rate control layer 40.

Figure 7A:
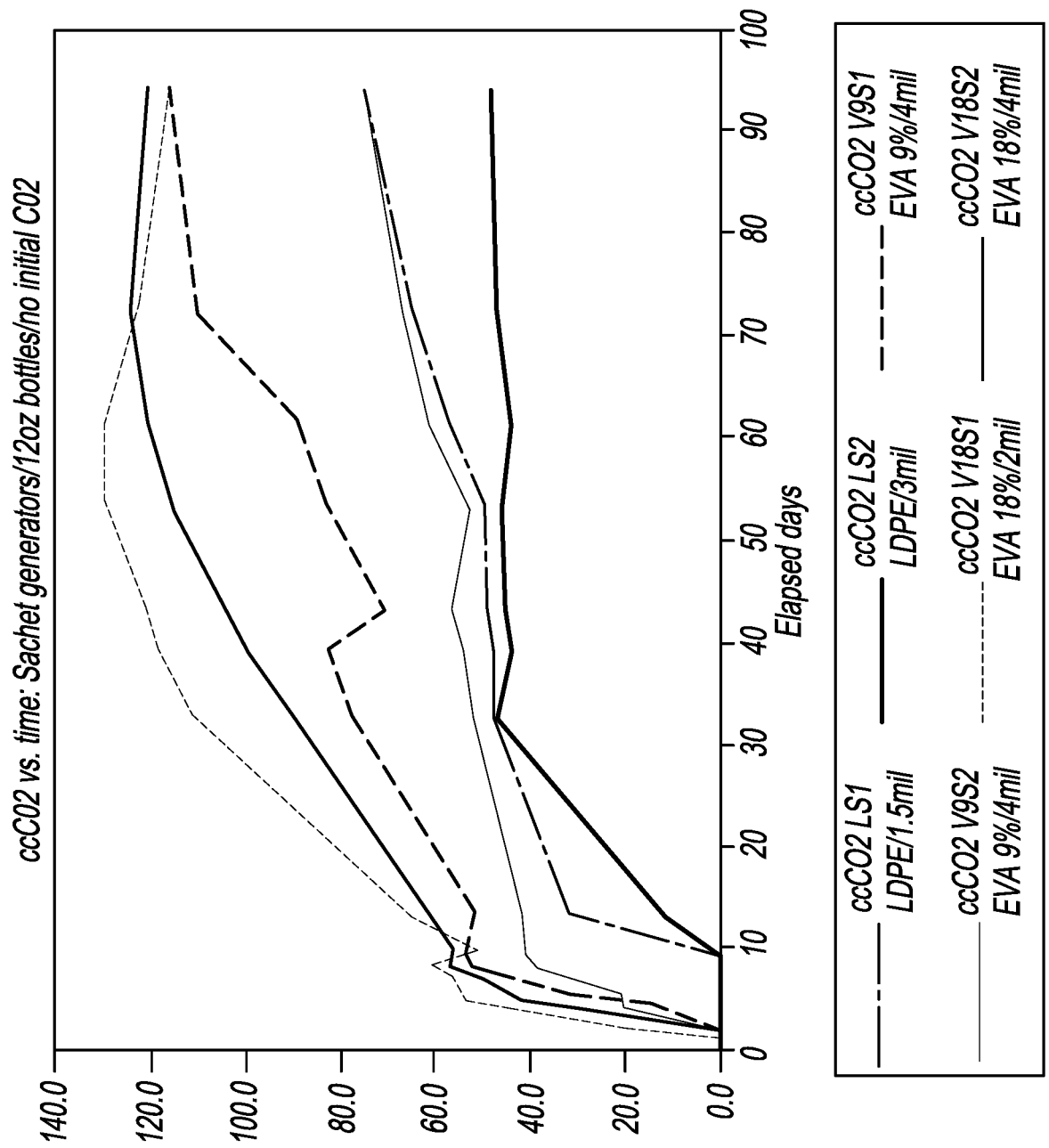
Figure 7B:
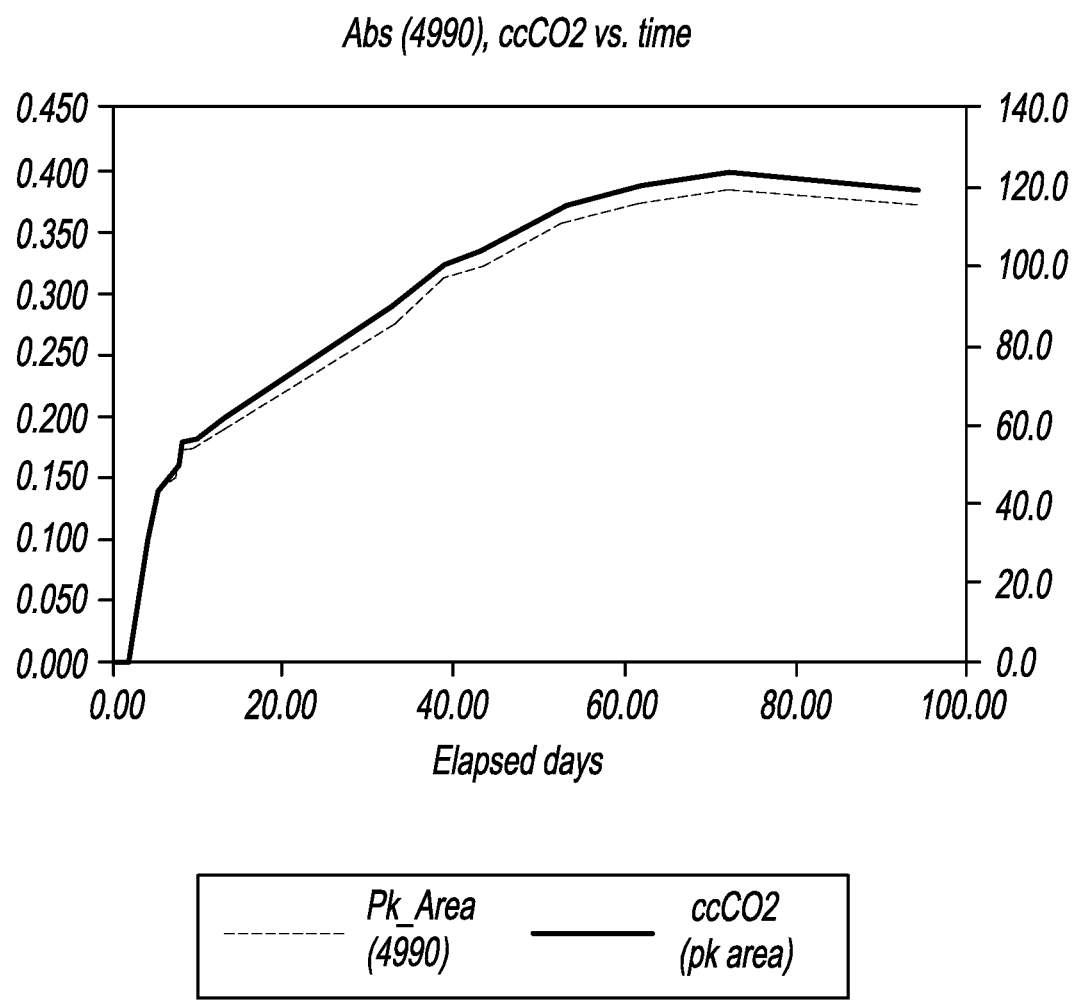
Figure 7C:
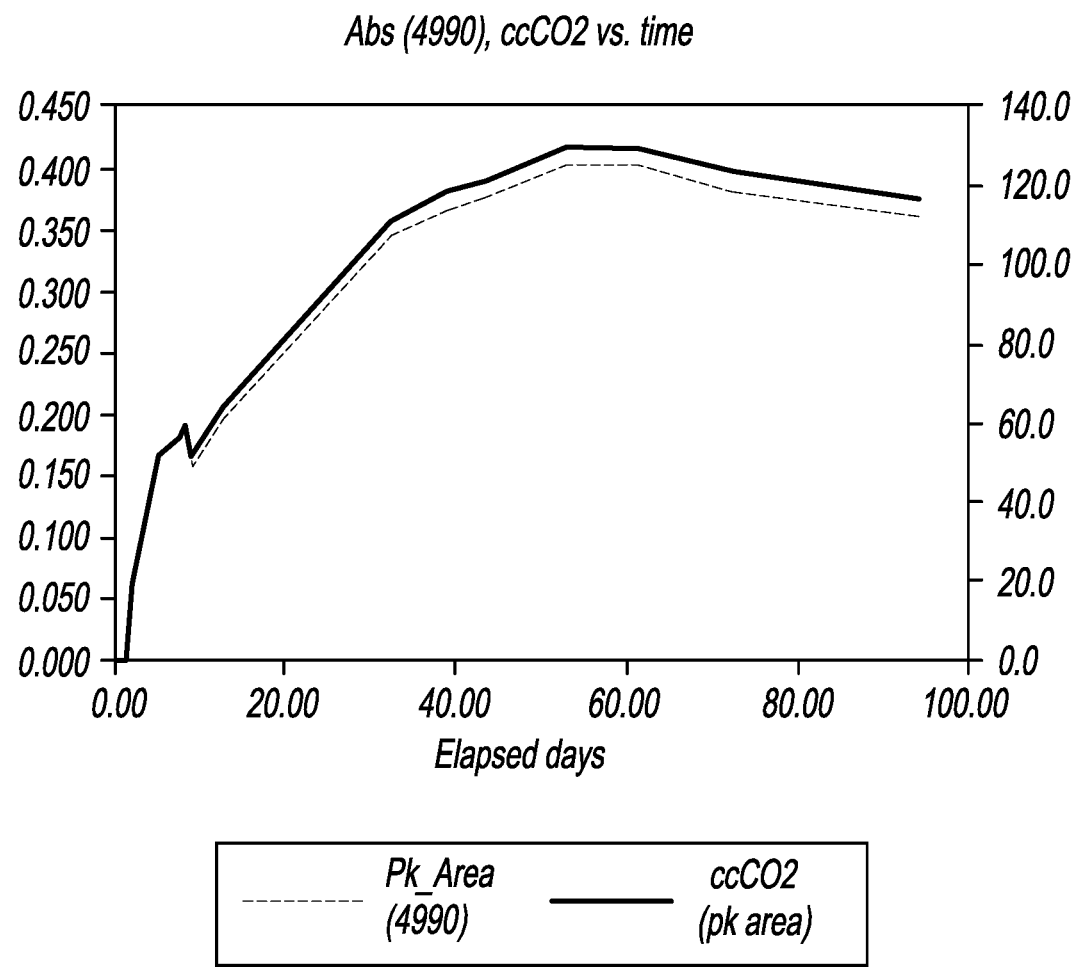
Figure 7D:
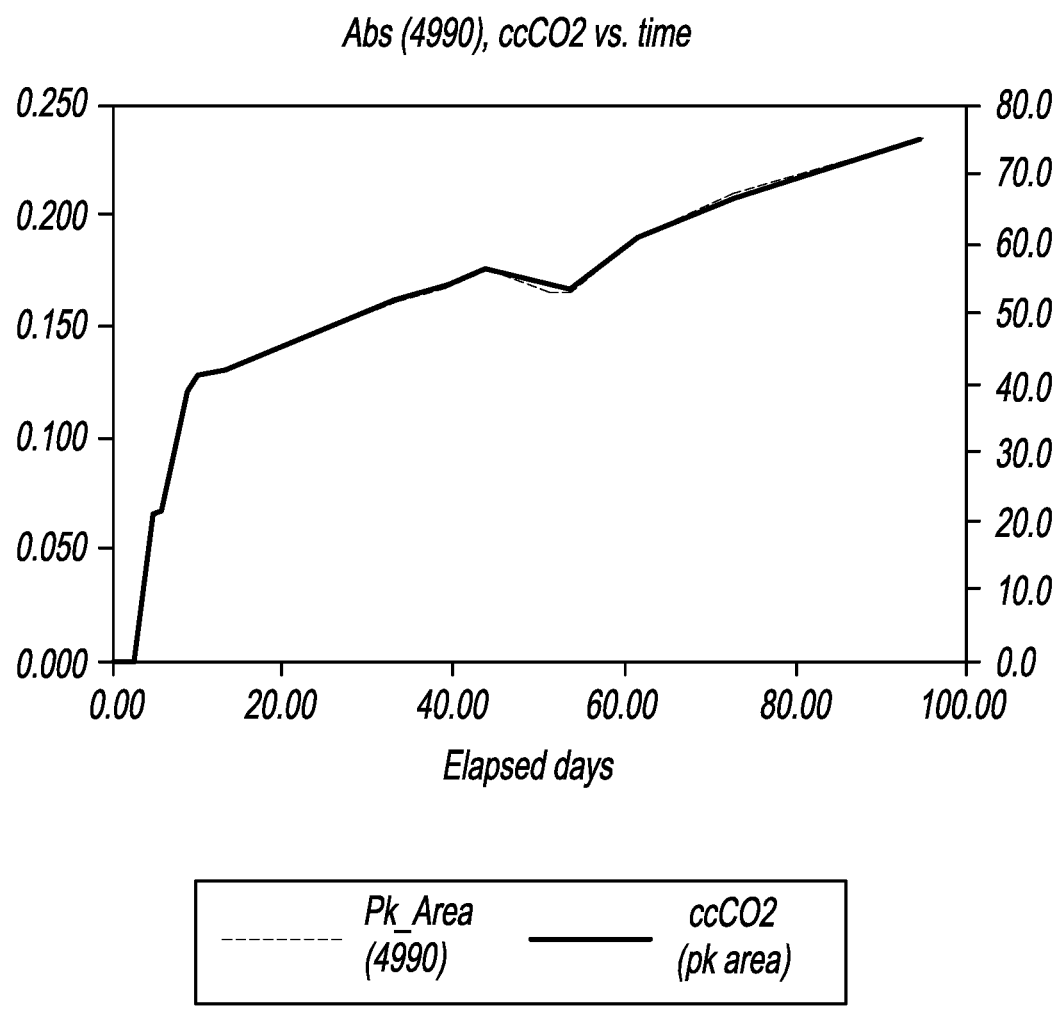
Figure 7E:
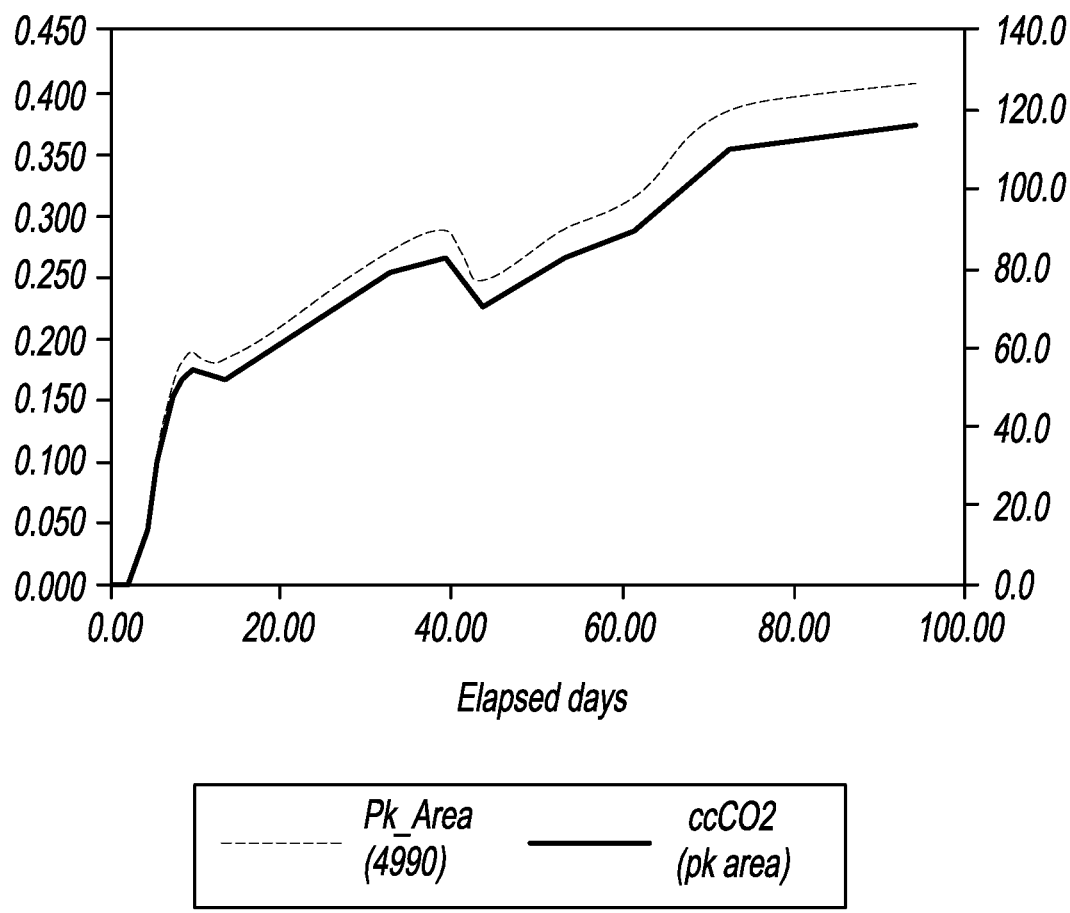
Figure 7F:
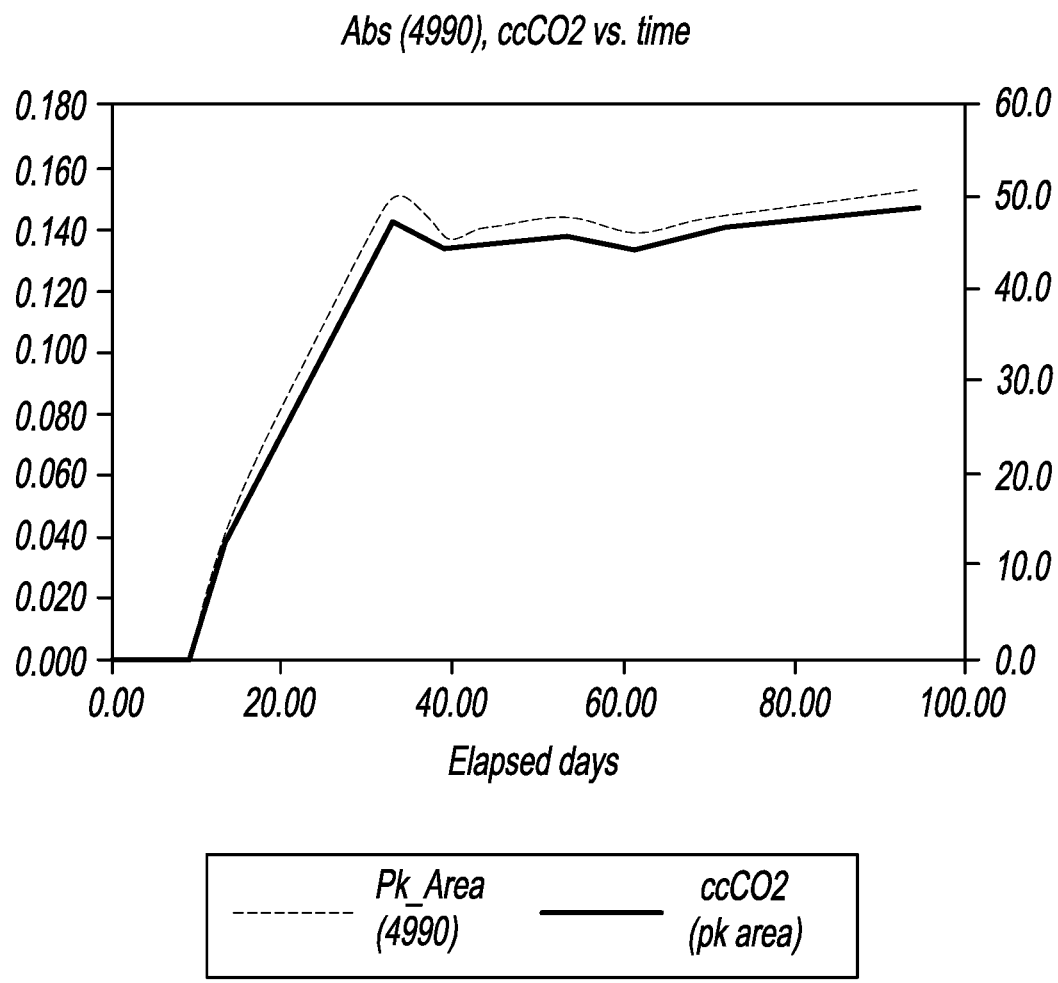
Figure 7G:
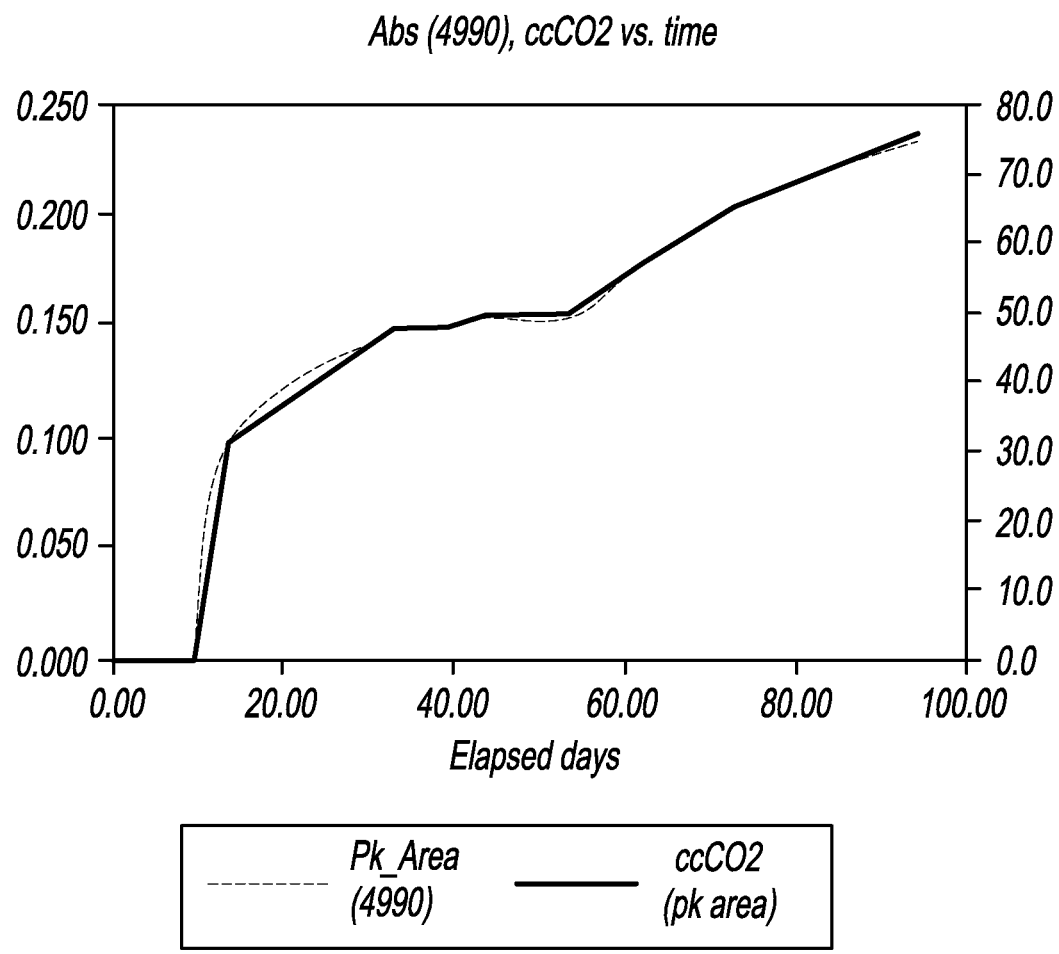
Figure 7H:
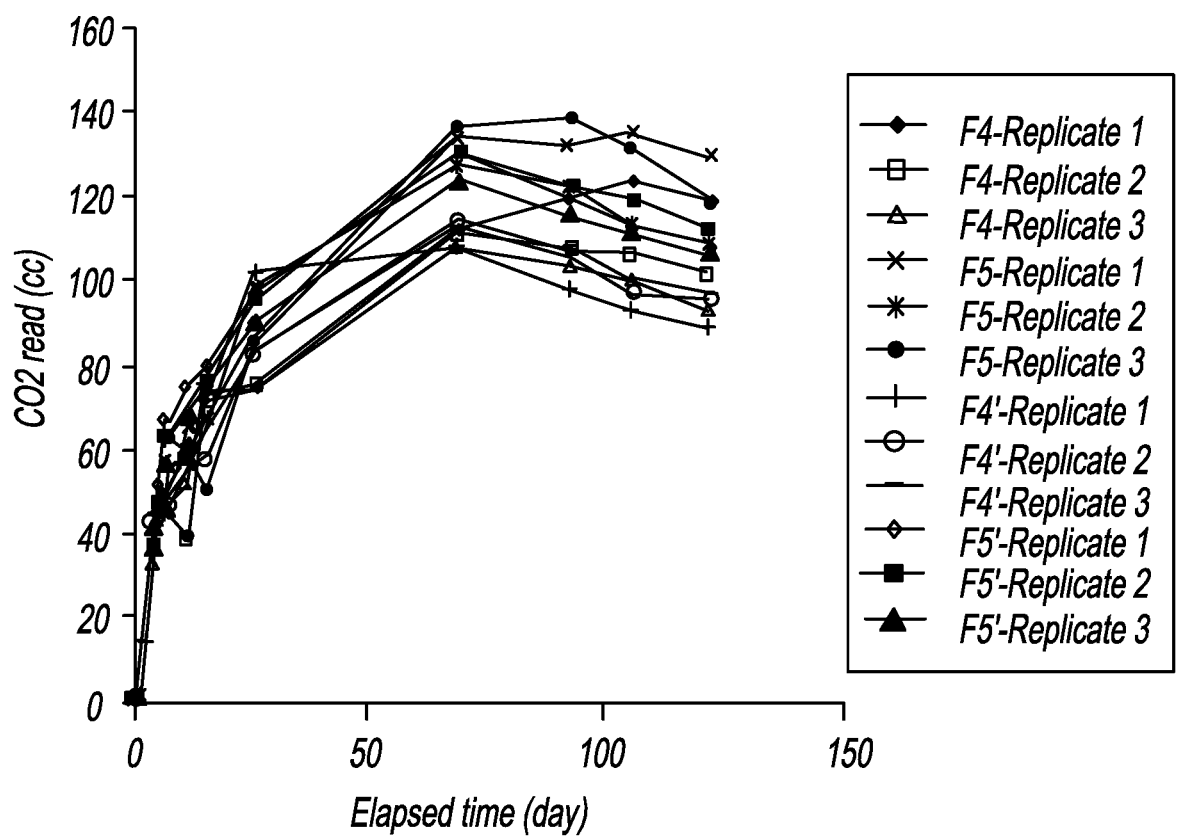

With respect to FIG. 7H, CO2 profiles with different tablet formulations are provided. CO2 reading is lower than the experimental capacity of the formulation. This is due to the CO2 outgress from the PET test bottle. The test was performed with tablets contained in 2 mils EVA 18% sachet (in a PET bottle with 10 ml water) at room temperature.

With reference to block 122, the carbon dioxide emitter 30 can be formed in any suitable manner, such as by direct compression or injection molding. With reference to block 124, the formed carbon dioxide emitter 30 is inserted into the closure bore 26. At block 126, the percentage of vinyl acetate required for the release rate control layer 40 at a thickness of about 0.2 mm to 0.5 mm, or about 0.25 mm, for example, and at the determined diameter of the carbon dioxide emitter 30 is determined. At block 128, the release rate control layer 40 is overmolded onto the carbon dioxide emitter 30.

With reference to block 130, the container 50, or any other suitable container, is filled with product, such as carbonated product. The filled container 50 is then capped with the closure 10. The closure 10 extends the shelf life of the carbonated product by offsetting carbon dioxide that is lost through the container 50 with supplemental carbon dioxide. Specifically, water vapor from the carbonated product permeates the release rate control layer 40 and enters the carbon dioxide emitter 30 to activate the bicarbonate (BC) of the carbon dioxide emitter 30. The bicarbonate (BC) generates carbon dioxide, which permeates the release rate control layer 40 at a time and rate controlled by the release rate control layer 40, in order to emit supplemental carbon dioxide into the container 50.

FIG. 8 illustrates how $CO_2$ generation capacity of the carbon dioxide emitter 30 is affected by the bicarbonate to carbonate (BC/CA) stoichiometry ratio. Specifically, the plot of FIG. 8 shows that a BC/CA stoichiometry ratio between 3-5 should be used in the formulation of the carbon dioxide emitter 30 to achieve high $CO_2$ capacity. Lower or higher stoichiometry ratio than 3-5 would provide lower $CO_2$ capacity. Selection of acid and bases or their blends should be based on a stoichiometry ratio range that can provide high $CO_2$ capacity.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure for a container, the closure comprising:
   a closure flange defining a closure bore;
   a carbon dioxide emitter seated within the closure bore and including bicarbonate, an acid catalyst, and a humectant; and
   a release rate control layer seated within the closure bore on the carbon dioxide emitter and configured to control release of carbon dioxide from the carbon dioxide emitter into the container when the closure is coupled to the container, the release rate control layer extends from the carbon dioxide emitter to the closure flange, the release rate control layer overlaps both an inner surface of the closure flange and a distal end surface of the closure flange;
   wherein the humectant includes at least one of polyvinyl pyrrolidone and microcrystalline cellulose that provide the carbon dioxide emitter with an affinity to water; and
   wherein the carbon dioxide emitter has a bicarbonate to carbonate stoichiometry ratio within the range of 3 to 5.

2. The closure of claim 1, wherein the release rate control layer is over-molded onto the carbon dioxide emitter.

3. The closure of claim 2, wherein the release rate control layer extends out from within the bore.

4. The closure of claim 1, wherein the carbon dioxide emitter is a disc seated within the closure bore.

5. The closure of claim 1, wherein the release rate control layer is configured to control the rate and timing of carbon dioxide released into the container from the carbon dioxide emitter.

6. The closure of claim 1, wherein the release rate control layer is configured to permit water vapor to pass through the release rate control layer to the carbon dioxide emitter.

7. The closure of claim 1, wherein the closure includes at least one of the following materials: polypropylene; low-density polyethylene; and high-density polyethylene.

8. The closure of claim 1, wherein the carbon dioxide emitter is formed by direct compression or injection molding, and has a disc shape.

9. The closure of claim 1, wherein the bicarbonate is selected from the group consisting of sodium bicarbonate, potassium bicarbonate, cesium bicarbonate, magnesium bicarbonate, calcium bicarbonate, ammonium bicarbonate, and lithium bicarbonate.

10. The closure of claim 1, wherein the acid catalyst is selected from the group consisting of citric acid, phosphoric acid, tartaric acid, L-malic acid, adipic acid, fumaric acid, and stearic acid.

11. The closure of claim 1, further comprising a dry lubricant.

12. The closure of claim 11, wherein the dry lubricant includes magnesium stearate.

13. The closure of claim 1, wherein the bicarbonate is configured with a weight that results in product of the container losing about 19% carbon dioxide after 12-14 weeks so as to provide the product with a shelf-life of at least 12-14 weeks.

14. The closure of claim 1, wherein the carbon dioxide emitter includes an additive configured for quality control.

15. The closure of claim 14, wherein the additive includes an optical tracer.

16. The closure of claim 1, wherein the release rate control layer includes at least one ethylene-vinyl acetate copolymer.

17. The closure of claim 1, wherein the release rate control layer includes at least one of low-density polyethylene, ethylene-vinyl acetate, and polyvinyl acetate.

18. The closure of claim 17, wherein the release rate control layer includes 0% to 33% vinyl acetate.

19. The closure of claim 1, wherein a start lag time of the release rate control layer, which is a time at which the release rate control layer is configured to permit release of carbon dioxide from the carbon dioxide emitter into the container, is equal to thickness of the release rate control layer squared divided by six times a diffusion constant of a selected EVA release rate control layer composition.

20. The closure of claim 1, wherein the release rate control layer includes an ethylene-vinyl acetate composition of from 0% to 33% vinyl acetate, which determines a material constant of carbon dioxide permeability divided by water permeability.

21. The closure of claim 1, wherein the material constant controls water vapor permeation and carbon dioxide release rate by way of permeability.

22. The closure of claim 1, wherein the release rate control layer is applied over the carbon dioxide emitter by at least one of injection molding, over-molding, dual-shot molding, and compression molding.

23. The closure of claim 1, wherein the release rate control layer encapsulates the carbon dioxide emitter and provides a hermetic seal with a bore or recess of the closure.

24. The closure of claim 1, wherein the closure has a diameter of 18 mm to 38 mm.

25. The closure of claim 1, wherein the closure has a diameter of 22 mm, 28 mm, 33 mm, or 38 mm.

26. The closure of claim 1, further comprising the container, wherein the container has a capacity of 8 oz to 20 oz.

27. The closure of claim 1, further comprising the container, wherein the container has a capacity of 8 oz, 12 oz, 20 oz, or 500 ml.

28. The closure of claim 1, further comprising the container, wherein the container is made from mono-layer polyethylene terephthalate.

29. The closure of claim 1, wherein the carbon dioxide emitter is coated with at least one of the following: Acrylate copolymers, Eudragit E, Cellulosic polymers, carboxymethylcellulose sodium, hydroxypropylcellulose, hydroxypropylm ethylcellulose, methylcellulose, polyethyleneglycols, povidone, Methacrylic acid copolymer, Eudragit L and s® (anionic copolymers), cellulose acetate phthalate, hydraxypropyl methylcellulose phthalate, polyvinyl acetate phthalate, ethyl cellulose, Cellulose acetate phthalate, Polyvinyl acetate phthalate, and sugar.

30. A closure for a container, the closure comprising:
a base;
an annular wall extending from the base, the annular wall including internal threads configured to cooperate with a finish of the container;
a closure flange extending from the base and surrounded by the annular wall, the closure flange is annular and defines a closure bore;
a carbon dioxide emitter seated entirely within the closure bore, the carbon dioxide emitter including bicarbonate, an acid catalyst, and a humectant; and
a release rate control layer seated within the closure bore on the carbon dioxide emitter, the release rate control layer configured to control release of carbon dioxide from the carbon dioxide emitter into the container when the closure is coupled to the container;
wherein:
the humectant includes at least one of polyvinyl pyrrolidone and microcrystalline cellulose that provide the carbon dioxide emitter with an affinity to water;
the carbon dioxide emitter has a bicarbonate to carbonate stoichiometry ratio within the range of 3 to 5;
the release rate control layer extends from the carbon dioxide emitter to along an inner surface of the closure flange that is opposite to an outer surface of the closure flange, the outer surface of the closure flange faces the internal threads of the annular wall;
the release rate control layer overlaps a distal end surface of the closure flange, the distal end surface is at an end of the closure flange opposite to the base; and
the closure flange and the annular wall are spaced apart to define a receptacle therebetween configured to receive the finish of the container.

* * * * *

UNITED STATES PATENT AND TRADEMARK OFFICE
CERTIFICATE OF CORRECTION

| | | |
|---|---|---|
| PATENT NO. | : 11,708,208 B2 | Page 1 of 1 |
| APPLICATION NO. | : 16/466394 | |
| DATED | : July 25, 2023 | |
| INVENTOR(S) | : John Brace et al. | |

It is certified that error appears in the above-identified patent and that said Letters Patent is hereby corrected as shown below:

In the Specification

In Column 7, Line 17, "carbonate" should be replaced with – citric acid –.

In the Claims

In Column 8, Line 61, Claim 1, "carbonate" should be replaced with – citric acid –.

Signed and Sealed this
Eighteenth Day of March, 2025

Coke Morgan Stewart
*Acting Director of the United States Patent and Trademark Office*